United States Patent
Hill et al.

(10) Patent No.: US 8,648,861 B2
(45) Date of Patent: Feb. 11, 2014

(54) TWO-DIMENSIONAL VECTOR FILLS USING TOPOLOGICAL RECIPES

(75) Inventors: Kenneth Jamieson Hill, South Lyon, MI (US); Mitchell Jay Silverman, Ann Arbor, MI (US)

(73) Assignee: Autodesk, Inc., San Rafael, CA (US)

( * ) Notice: Subject to any disclaimer, the term of this patent is extended or adjusted under 35 U.S.C. 154(b) by 190 days.

(21) Appl. No.: 13/363,143

(22) Filed: Jan. 31, 2012

(65) Prior Publication Data

US 2012/0194535 A1 Aug. 2, 2012

Related U.S. Application Data

(60) Provisional application No. 61/438,040, filed on Jan. 31, 2011.

(51) Int. Cl.
*G06T 11/20* (2006.01)
*G06F 17/00* (2006.01)
*G09G 5/00* (2006.01)
*G06F 3/00* (2006.01)

(52) U.S. Cl.
USPC ........... 345/442; 345/418; 345/619; 715/211; 715/700; 715/964

(58) Field of Classification Search
USPC .............. 345/418, 581, 619, 441–442, 469.1, 345/470, 156, 501; 382/202–203, 254, 266, 382/307, 316; 715/200, 211, 247, 273, 700, 715/764, 851, 856, 861, 866, 961, 964–965
See application file for complete search history.

(56) References Cited

U.S. PATENT DOCUMENTS

| | | | | |
|---|---|---|---|---|
| 6,466,229 | B1 * | 10/2002 | Nagao | 345/621 |
| 2004/0194020 | A1 * | 9/2004 | Beda et al. | 715/502 |
| 2009/0184964 | A1 * | 7/2009 | Perani et al. | 345/441 |
| 2009/0184966 | A1 * | 7/2009 | Perani et al. | 345/442 |

\* cited by examiner

*Primary Examiner* — Wesner Sajous
(74) *Attorney, Agent, or Firm* — Gates & Cooper LLP

(57) ABSTRACT

A method, apparatus, article of manufacture, and computer readable storage medium provide the ability to update a fill region of a computer drawing. A topological recipe representing the fill region is defined. The recipe includes a region set (of regions to be filled where the regions are areas bound by contours), a contour set (of contours that are a chain of curve segments), and curve segments. A final fill area of the fill region based on the topological recipe is computed. The final fill area is displayed and the curve segments are then modified. In response to the modification of the curve segments, the final fill area is dynamically updated and displayed.

24 Claims, 20 Drawing Sheets

TWO-DIMENSIONAL VECTOR FILLS USING TOPOLOGICAL RECIPES

CROSS-REFERENCE TO RELATED APPLICATIONS

This application claims the benefit under 35 U.S.C. Section 119(e) of the following co-pending and commonly-assigned U.S. provisional patent application(s), which is/are incorporated by reference herein:

Provisional Application Ser. No. 61/438,040, filed on Jan. 31, 2011, 2010, by Kenneth Jamieson Hill and Mitchell Jay Silverman, entitled "TWO-DIMENSIONAL VECTOR FILLS USING TOPOLOGICAL RECIPES".

BACKGROUND OF THE INVENTION

1. Field of the Invention

The present invention relates generally to computer drawing applications, and in particular, to a method, apparatus, and article of manufacture for providing and modifying two-dimensional vector fills using topological features/entities.

2. Description of the Related Art

Two-dimensional (2D) vector applications usually provide a means to fill regions. Some 2D vector applications require the user to define closed shapes, and only fill those shapes. Other applications allow the fill to be defined by picking an empty region that is bound by vector curves. Such applications may fill a region bound by curves, but typically, the region becomes fixed as a closed shape. Some applications will allow editing of the closed region, for example when a new curve is placed over a region, the region becomes split. However, the fill for such an application is limited by the closed shape and the fill is modified by modifying the closed shape.

Accordingly, some prior art applications limit the ability to create a fill to closed shapes. Alternative prior art applications allow a user to create curves and create a fill region. However, such applications often create a polygon that is used for the fill. Thereafter, the fill region is edited by editing the polygon. In addition, in such prior art applications, if a fill region is broken (e.g., a curve is moved to create an open shape), the user may be required to manually refresh the page in order to update the fill (i.e., the fill may remain on the screen despite the now broken fill region until a manual update operation is performed). In addition, if after breaking a fill region, the user attempts to draw a curve and create a modified fill region, the fill is not automatically created. Instead, the user must undertake manual operations to create the fill region based on the new curves.

In view of the above, the prior art fails to provide the ability to dynamically update a drawing and modify curves while a fill region (e.g., color or texture) is automatically updated to reflect the modified curves. Further, the prior art fails to provide the ability to dynamically update a fill/fill region that reflects a user's original intent.

SUMMARY OF THE INVENTION

Embodiments of the invention "remember" the region selected by a topological recipe so that as the curves bounding the region are moved about, the recipe can be re-baked to determine the extant representation of the region. Furthermore, the recipe can be used to find a "best match" region in the event that there is no region that precisely matches the recipe.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Overview

Prior art 2D vector applications are flawed in that an original definition of a fill region is forgotten. In this regard, as a user evolves a drawing, the fill region best matching the original state cannot be recovered. Embodiments of the invention overcome such problems by providing and utilizing a topological recipe of a fill region to enable dynamic updates to the fill region during editing.

Hardware Environment

Figure 1:
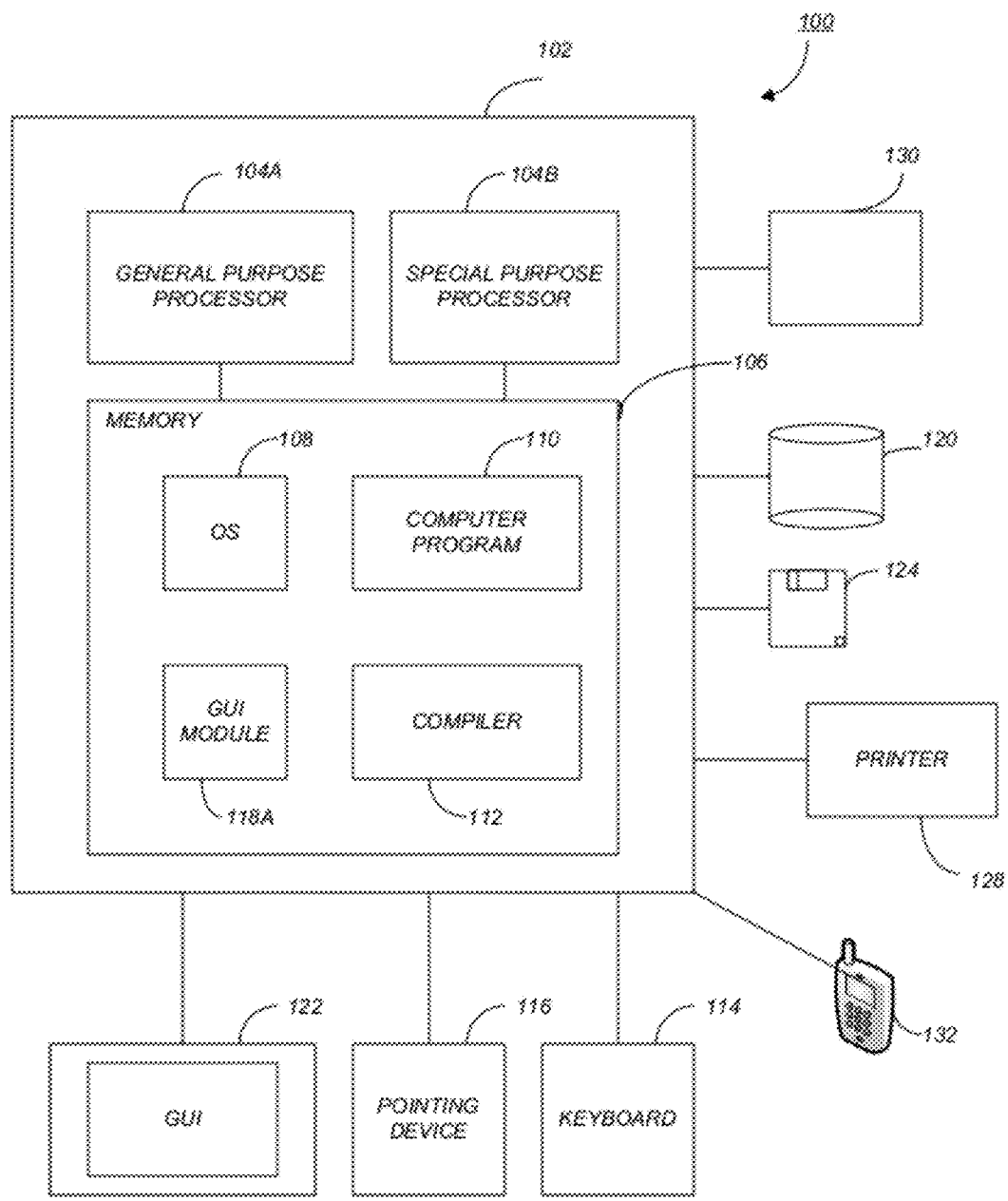
FIG. 1 is an exemplary hardware and software environment used to implement one or more embodiments of the invention.

FIG. 1 is an exemplary hardware and software environment 100 used to implement one or more embodiments of the invention. The hardware and software environment includes a computer 102 and may include peripherals. Computer 102 may be a user/client computer, server computer, or may be a database computer. The computer 102 comprises a general purpose hardware processor 104A and/or a special purpose hardware processor 104B (hereinafter alternatively collectively referred to as processor 104) and a memory 106, such as random access memory (RAM). The computer 102 may comprise, or may be coupled to, and/or integrated with, other devices, including input/output (I/O) devices such as a keyboard 114, a cursor control device 116 (e.g., a mouse, a pointing device, pen and tablet, touch screen, multi-touch device, etc.) and a printer 128. In one or more embodiments, computer 102 may be coupled to, or may comprise, a portable or media viewing/listening device 132 (e.g., an MP3 player, iPod™, Nook™, portable digital video player, cellular device, personal digital assistant, etc.). In yet another embodiment, the computer 102 may comprise a multi-touch device, mobile phone, gaming system, internet enabled television, television set top box, or other internet enabled device executing on various platforms and operating systems.

In one embodiment, the computer 102 operates by the general purpose processor 104A performing instructions defined by the computer program 110 under control of an operating system 108. The computer program 110 and/or the operating system 108 may be stored in the memory 106 and may interface with the user and/or other devices to accept input and commands and, based on such input and commands and the instructions defined by the computer program 110 and operating system 108, to provide output and results.

Output/results may be presented on the display 122 or provided to another device for presentation or further processing or action. In one embodiment, the display 122 comprises a liquid crystal display (LCD) having a plurality of separately addressable liquid crystals. Alternatively, the display 122 may comprise a light emitting diode (LED) display having clusters of red, green and blue diodes driven together to form full-color pixels. Each liquid crystal or pixel of the display 122 changes to an opaque or translucent state to form a part of the image on the display in response to the data or information generated by the processor 104 from the application of the instructions of the computer program 110 and/or operating system 108 to the input and commands. The image may be provided through a graphical user interface (GUI) module 118A. Although the GUI module 118A is depicted as a separate module, the instructions performing the GUI functions can be resident or distributed in the operating system 108, the computer program 110, or implemented with special purpose memory and processors.

In one or more embodiments, the display 122 is integrated with/into the computer 102 and comprises a multi-touch device having a touch sensing surface (e.g., track pod or touch screen) with the ability to recognize the presence of two or more points of contact with the surface. Examples of a multi-touch devices include mobile devices (e.g., iPhone™, Nexus S™, Droid™ devices, etc.), tablet computers (e.g., iPad™, HP Touchpad™), portable/handheld game/music/video player/console devices (e.g., iPod Touch™, MP3 players, Nintendo 3DS™, PlayStation Portable™, etc.), touch tables, and walls (e.g., where an image is projected through acrylic and/or glass, and the image is then backlit with LEDs).

Some or all of the operations performed by the computer 102 according to the computer program 110 instructions may be implemented in a special purpose processor 104B. In this embodiment, the some or all of the computer program 110 instructions may be implemented via firmware instructions stored in a read only memory (ROM), a programmable read only memory (PROM) or flash memory within the special purpose processor 104B or in memory 106. The special purpose processor 104B may also be hardwired through circuit design to perform some or all of the operations to implement the present invention. Further, the special purpose processor 104B may be a hybrid processor, which includes dedicated circuitry for performing a subset of functions, and other circuits for performing more general functions such as responding to computer program instructions. In one embodiment, the special purpose processor is an application specific integrated circuit (ASIC).

The computer 102 may also implement a compiler 112 that allows an application program 110 written in a programming language such as COBOL, Pascal, C++, FORTRAN, or other language to be translated into processor 104 readable code. Alternatively, the compiler 112 may be an interpreter that executes instructions/source code directly, translates source code into an intermediate representation that is executed, or that executes stored precompiled code. Such source code may be written in a variety of programming languages such as Java™, Perl™, Basic™, etc. After completion, the application or computer program 110 accesses and manipulates data accepted from I/O devices and stored in the memory 106 of the computer 102 using the relationships and logic that were generated using the compiler 112.

The computer 102 also optionally comprises an external communication device such as a modem, satellite link, Ethernet card, or other device for accepting input from, and providing output to, other computers 102.

In one embodiment, instructions implementing the operating system 108, the computer program 110, and the compiler 112 are tangibly embodied in a non-transient computer-readable medium, e.g., data storage device 120, which could include one or more fixed or removable data storage devices, such as a zip drive, floppy disc drive 124, hard drive, CD-ROM drive, tape drive, etc. Further, the operating system 108 and the computer program 110 are comprised of computer program instructions which, when accessed, read and executed by the computer 102, cause the computer 102 to perform the steps necessary to implement and/or use the present invention or to load the program of instructions into a memory, thus creating a special purpose data structure causing the computer to operate as a specially programmed computer executing the method steps described herein. Computer program 110 and/or operating instructions may also be tangibly embodied in memory 106 and/or data communications devices 130, thereby making a computer program product or article of manufacture according to the invention. As such, the terms "article of manufacture," "program storage device," and "computer program product," as used herein, are intended to encompass a computer program accessible from any computer readable device or media.

Of course, those skilled in the art will recognize that any combination of the above components, or any number of different components, peripherals, and other devices, may be used with the computer 102.

Figure 2:
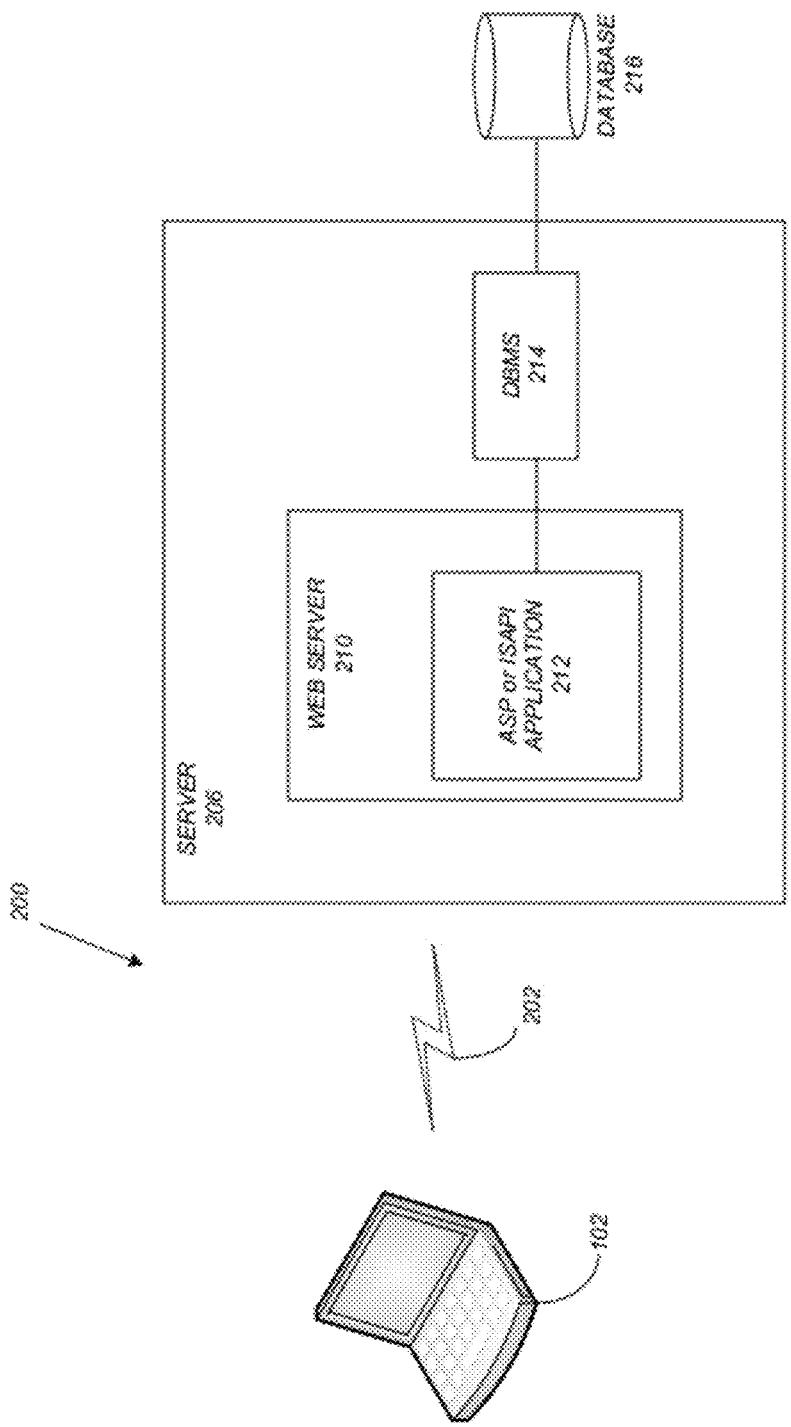
FIG. 2 schematically illustrates a typical distributed computer system using a network to connect client computers to server computers in accordance with one or more embodiments of the invention.

FIG. 2 schematically illustrates a typical distributed computer system 200 using a network 202 to connect client computers 102 to server computers 206. A typical combination of resources may include a network 202 comprising the Internet, LANs (local area networks), WANs (wide area networks), SNA (systems network architecture) networks, or the like, clients 102 that are personal computers or workstations, and servers 206 that are personal computers, workstations, minicomputers, or mainframes (as set forth in FIG. 1). However, it may be noted that different networks such as a cellular network (e.g., GSM [global system for mobile communications] or otherwise), a satellite based network, or any other type of network may be used to connect clients 102 and servers 206 in accordance with embodiments of the invention.

A network 202 such as the Internet connects clients 102 to server computers 206. Network 202 may utilize Ethernet, coaxial cable, wireless communications, radio frequency (RF), etc. to connect and provide the communication between clients 102 and servers 206. Clients 102 may execute a client application or web browser and communicate with server computers 206 executing web servers 210. Such a web browser is typically a program such as MICROSOFT INTERNET EXPLORER™, MOZILLA FIREFOX™, OPERA™, APPLE SAFARI™, etc. Further, the software executing on clients 102 may be downloaded from server computer 206 to client computers 102 and installed as a plug in or ACTIVEX™ control of a web browser. Accordingly, clients 102 may utilize ACTIVEX™ components/component object model (COM) or distributed COM (DCOM) components to provide a user interface on a display of client 102. The web server 210 is typically a program such as MICROSOFT'S INTERNET INFORMATION SERVER™.

Web server 210 may host an Active Server Page (ASP) or Internet Server Application Programming Interface (ISAPI) application 212, which may be executing scripts. The scripts invoke objects that execute business logic (referred to as business objects). The business objects then manipulate data in database 216 through a database management system (DBMS) 214. Alternatively, database 216 may be part of, or connected directly to, client 102 instead of communicating/obtaining the information from database 216 across network 202. When a developer encapsulates the business functionality into objects, the system may be referred to as a component object model (COM) system. Accordingly, the scripts executing on web server 210 (and/or application 212) invoke COM objects that implement the business logic. Further, server 206 may utilize MICROSOFT'S™ Transaction Server (MTS) to access required data stored in database 216 via an interface such as ADO (Active Data Objects), OLE DB (Object Linking and Embedding DataBase), or ODBC (Open DataBase Connectivity).

Generally, these components 200-216 all comprise logic and/or data that is embodied in/or retrievable from device, medium, signal, or carrier, e.g., a data storage device, a data communications device, a remote computer or device coupled to the computer via a network or via another data communications device, etc. Moreover, this logic and/or data, when read, executed, and/or interpreted, results in the steps necessary to implement and/or use the present invention being performed.

Although the terms "user computer", "client computer", and/or "server computer" are referred to herein, it is understood that such computers 102 and 206 may be interchangeable and may further include thin client devices with limited or full processing capabilities, portable devices such as cell phones, notebook computers, pocket computers, multi-touch devices, and/or any other device with suitable processing, communication, and input/output capability.

Of course, those skilled in the art will recognize that any combination of the above components, or any number of different components, peripherals, and other devices, may be used with computers 102 and 206.

Software Embodiments

Embodiments of the invention are implemented as a software application on a client 102 or server computer 206. The software application enables the ability to perform a fill operation in a 2D vector drawing using a topological recipe. In this regard, embodiments of the invention are executed in a 2D vector based environment and not a raster based drawing. The differences between a raster drawing/drawing application and vector based drawing/drawing application are well known in the art. For example, vector based drawings enable the ability to move curves and objects around in a drawing whereas raster basted operations merely paint or modify every pixel bit for bit. When performing a fill operation, raster operations may fill an identified area with a particular color but the ability to modify the curves of a shape while automatically and dynamically updating a fill for such a shape is not available.

Embodiments of the invention provide for two different aspects: (1) the ability to store a recipe for a fill region to capture the user's intent; and (2) the process for dynamically updating a fill region based on such a recipe. Each aspect will be discussed in detail.

Topological Recipe for a Fill Region

When a user picks a region bound by a set of curves, embodiments of the invention record information about the following topological entities:

1—The regions to be filled, as areas bound by contours;
   2—The contours, as a chain of curve segments;
   3—The curve segments, that are defined by curve geometry, and termination information.

Such topological entities are often referred to herein as "names". To understand these topological entities, referring to FIG. 3, consider the example of filling a square 302 that has a circle 304 removed from its center. As described herein, there are no layers or draw order (i.e., the circle 304 is removed from the square 302 and is not merely a circle 304 with a white fill drawn over the square 302). There is a single region, bound by two contours 302 and 304. One contour is the outer square 302, the other contour is the inner circle 304.

The inner contour 304 is comprised of a single curve segment, whose termination information just says "use the whole curve."

The outer contour 302 is comprised of four (4) curve segments. Each segment is terminated at the intersection with the adjacent segment. Although in this example, the whole curve (i.e., each curve segment) is used by the contour (i.e., that bounds the region), one could imagine that the four (4) lines of the square 302 could be extended beyond their intersections with the adjacent curves, but only the portion between the adjacent curves would be used.

The topological information for the two contours 302 and 304 is stored in the document for the vector drawing. Whenever the fill needs to be drawn, the information can be interpreted to figure out exactly what needs to be filled.

However, sometimes the user does something that changes the topology so that a matching region cannot be found. In that case, the invention attempts to use matching rules to decide what should be filled, if anything. For example, with the square example, if the inner circle 304 is deleted or moved outside of the square 302, the square 302 may be filled without the circular hole 304.

Figure 3:
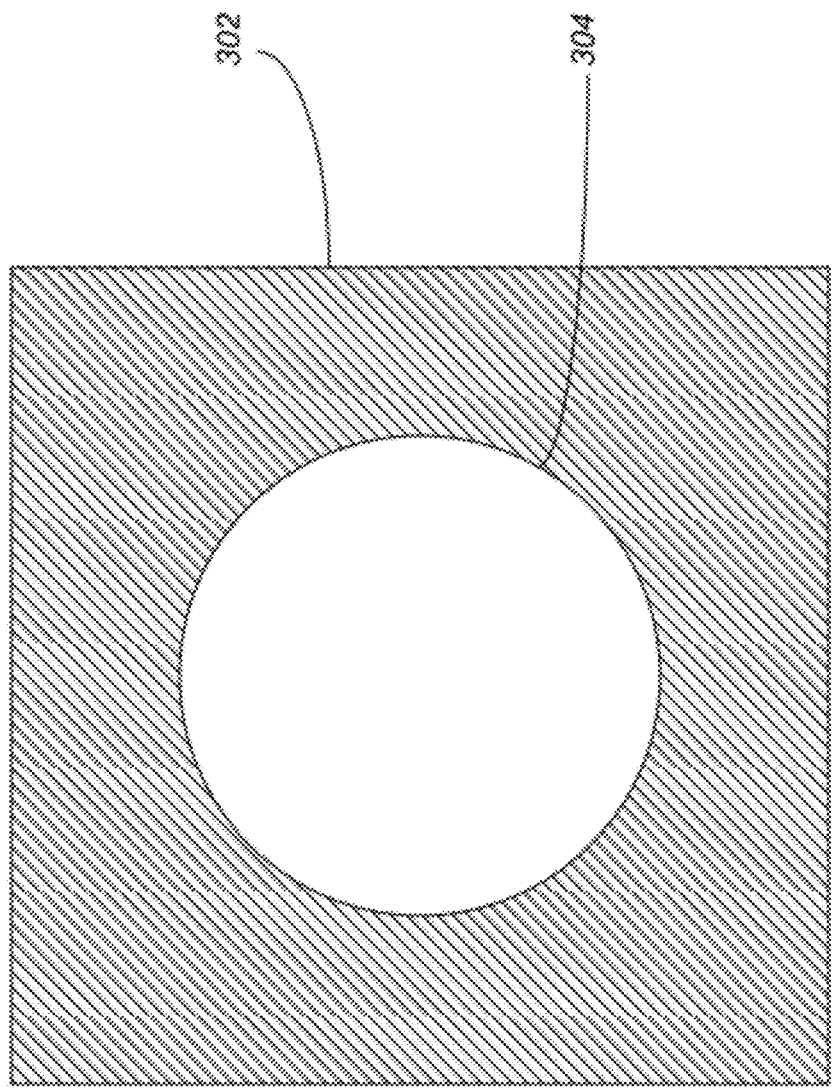
FIG. 3 illustrates an exemplary fill region consisting of a filled square that has a circle removed from its center in accordance with one or more embodiments of the invention.
Figure 4B:
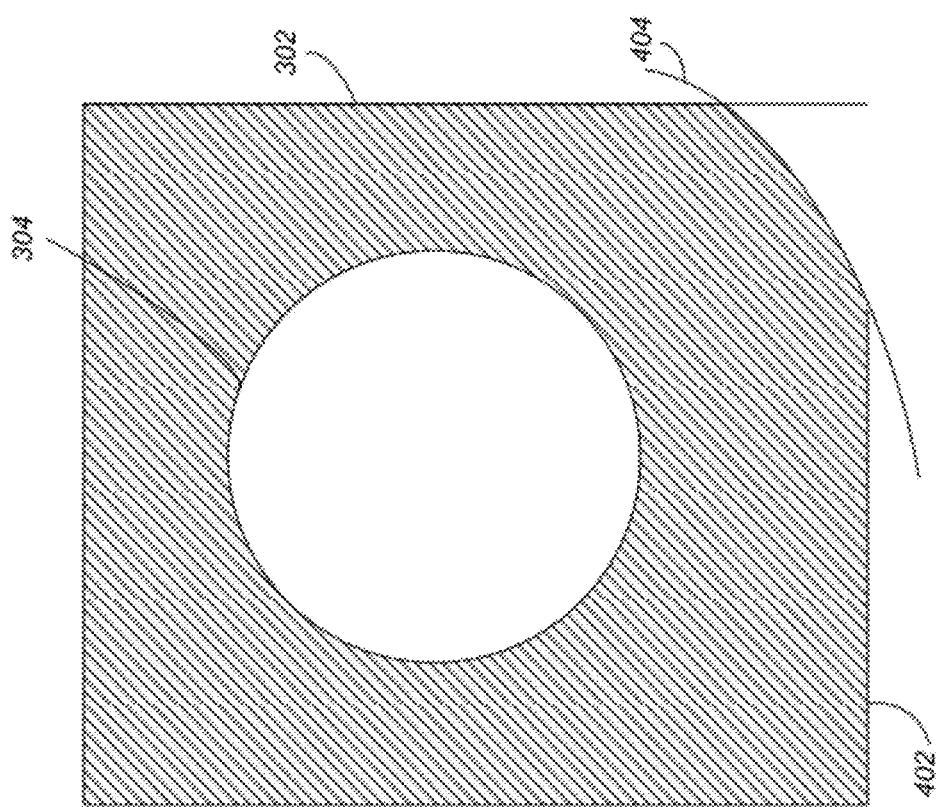
FIG. 4B illustrates the repair of the wound of FIG. 4A with a new curve thereby allowing the fill to be displayed again in accordance with one or more embodiments of the invention.
Figure 4A:
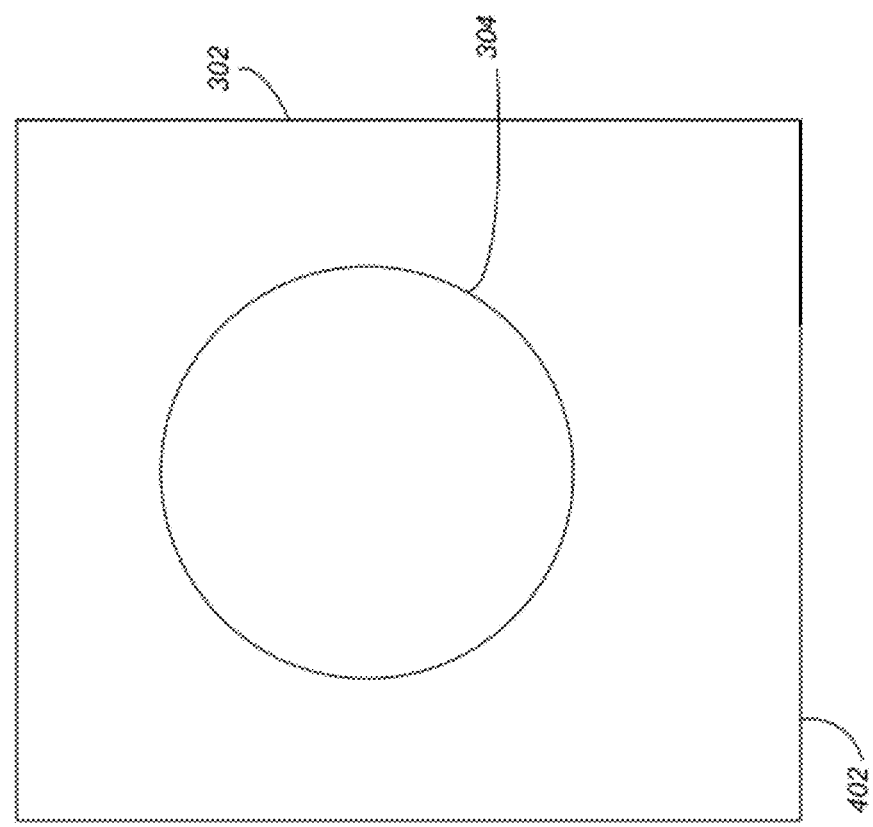
FIG. 4A illustrates a modified line of FIG. 3 to create an open polygon thereby allowing the fill to bleed out so that the fill is not displayed in accordance with one or more embodiments of the invention.

As another example, referring to FIGS. 3, 4A and 4B, if a line 402 of the square 302 boundary is moved/modified/deleted (as in FIG. 4A) so that the region/fill "bleeds out", then no fill is drawn (FIG. 4A illustrates a modified line 402 that creates an open polygon thereby allowing the fill to bleed out so that the fill is not displayed). If however, the wound is repaired with a new curve 404 (leaving the outer boundary with 5 segments), then the 5-sided outer boundary may be matched as an approximation to the 4 sided boundary stored in the topological recipe (FIG. 4B).

As described above, the topological recipe may include information about the regions, contours, and segments.

Region

The region defines the area to be filled bound by contours. Thus, the region is the actual fill region geometry and may have one (1) outer contour and zero (0) or more inner contours (e.g., holes). Alternatively, a region may have multiple outer contours. Multiple outer contours may result when the original region is split into pieces, all of which must be filled. Some embodiments might allow users to pick multiple region pieces as part of a single fill.

A region valid flag indicates whether a region can be successfully drawn. When the valid flag is false, no fill is drawn, but embodiments of the invention may attempt to continue trying to fix the fill while an edit is occurring. A kill flag indicates that the application is no longer attempting to fix a broken fill region and such a fill region should be deleted when convenient.

An outer bound list contains a list of geometric splines/curves that comprise the fill region boundary.

An inner bounds list is a list of lists—a list of holes in the fill region with each hole being a list of geometric splines.

In addition, a region operator may be used to perform operations on the region. The region operator has a logical list of input contours (one outer and zero or more inner contours) and the region as an output. It is the responsibility of the region operator to react to changes on any of the curves that feed into the segment names and rebuild the outer bounds list and then the inner bounds list of the region. As long as the region outer bounds list can be computed, the region is considered valid.

Contours

The contours specify curve segments that each have termination information. A names list provides a list of the original curve segments used in a contour. More specifically, the names list provides the segment names in piecewise continuous counter-clockwise order. The actual entity in a drawing can always be identified using an entity ID. Accordingly, each entity ID in the list may also be viewed as a pointer to a corresponding segment in a contour. In this regard, as used herein, an entity ID may be a method to reference other objects, and may vary from embodiment to embodiment.

A list of flags, one flag for each segment name may also be maintained. For each segment name, the flag indicates if the direction of the segment name's base curve must be reversed to traverse the contour in counter-clockwise direction.

In addition, contour information may also identify/hold the last good contour the application was able to draw (e.g., in a list of repaired names and repaired directions for such a "good" contour).

Curve Segments

The curve segment information defines curve geometry and geometry terminations for each segment of a contour. Thus, a curve segment is a concrete object that represents the segment of a curve. A curve segment may actually be a name that consists of an object that will try to record enough design intent such that the proper segment can be reclaimed after the geometry that defines the segment changes.

A segment may be identified by a base curve, two (2) bounding points, and the side of the curve the application is interested in. Further, a name may be used with a name matcher to reclaim the segment in some guise after a model changes. To maintain the design intent, embodiments of the invention record all things/information that may be useful in the name and the matcher may then be used to reclaim the segment as needed.

As the recorded curve segment relates to two bounding points, the recorded curve segment information may include one or more of the following for each of the bounding points:

(a) the number of intersections of the base curve and a first intersecting curve;

(b) an index of each intersection from (a);

(c) a determination (e.g., Boolean value) and a percentage representing whether the bounding point is result of an intersection with the first intersecting curve segment or a different intersecting curve segment;

(d) the parameters for the bounding point at the time of creation of the bounding point;

(e) a determination (e.g., Boolean value) regarding whether the segment of interest is in the positive parameter direction of the bounding point;

(f) an integer value for the bounding curve tangent that indicates whether the tangent crosses to the left, is parallel/anti-parallel, or crosses to the right;

In addition to the above information (which is recorded for each bounding point), embodiments of the invention may further record one or more following:

(h) a determination (e.g., Boolean value) regarding whether the segment name can be resolved;

(i) a determination (e.g., Boolean value) regarding whether the side of interest is in the positive direction;

(j) the parameters used to identify the segment; and (k) information regarding the point used to identify the segment.

Thus, in view of the above, the segment information may include pointers to the base curve and the two intersecting curves that make up a point segment. A different technique may be used to tie the curves to the segment name. However, logically, the segment name may be viewed as containing pointers to the base curve and the two intersecting curves.

Process for Dynamically Updating a Fill Region

Figure 5:
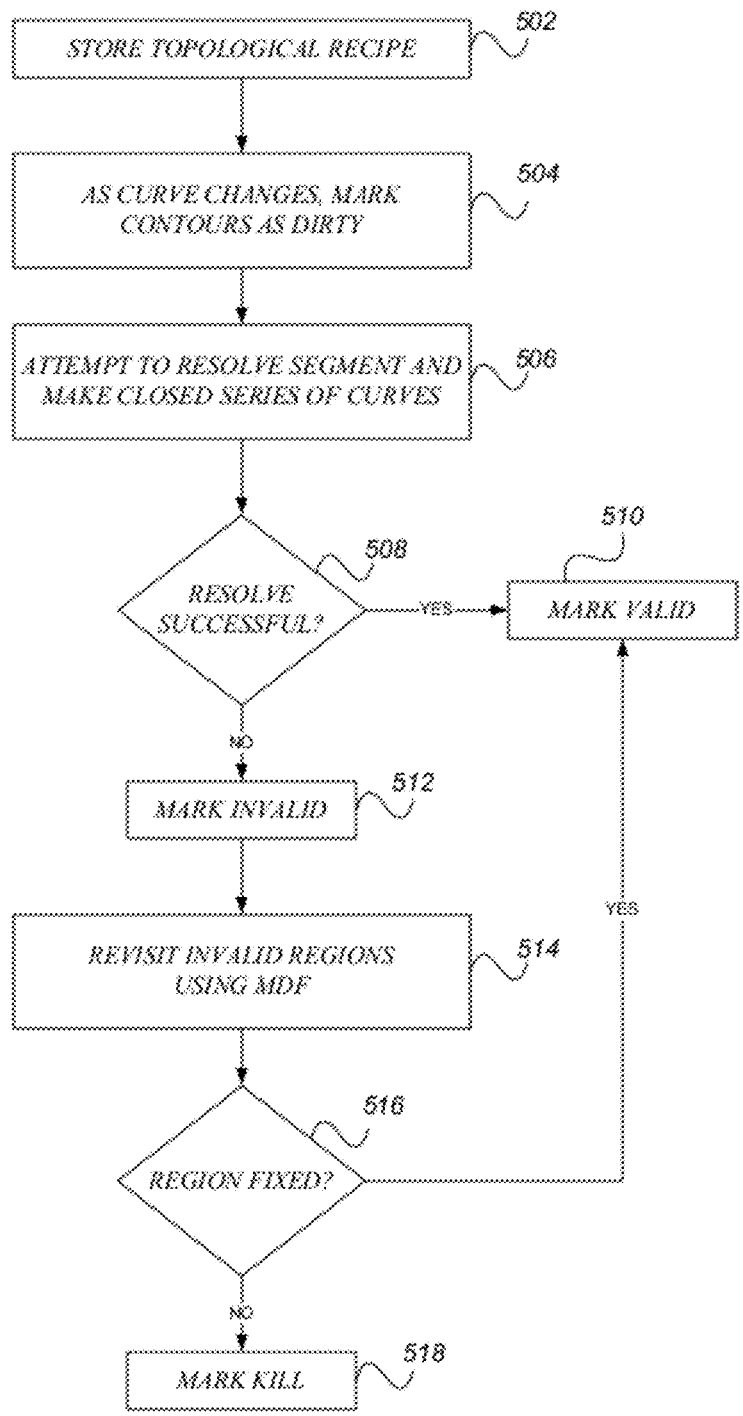
FIG. 5 illustrates the general flow for dynamically updating a fill region in accordance with one or more embodiments of the invention.

FIG. 5 illustrates the general flow for dynamically updating a fill region in accordance with one or more embodiments of the invention. At step 502, the topological recipe is stored as described above.

At step 504, when a curve changes, all the contours associated with the curve (through their segment names) are marked dirty. As the drawing evaluates, as part of the rendering process, the Region Operator (described above) attempts to resolve every segment name and make a closed series of curves for each contour at step 506. The main idea is that entities, including curves, have a "dirty bit" that is set when the entities are changed. If any entities in the compute graph are dirty, any entities that depend on them are considered dirty as well. When it's time to update the image (or whenever an up-to-date graph is needed), operator objects are called to compute successor (dependent) entities from their predecessors. In a simple compute model, the fill details (i.e. exactly what region is filled) have the entities involved in the topological recipe as predecessors.

A determination is made at step 508 regarding whether the resolve was successful. If the region operator can resolve this for at least the outer contour, it rebuilds the region's list of outer bounds, and when possible the list of inner bounds, and marks the region valid at step 510.

If the region operator cannot resolve the names, or if the names are no longer piecewise continuous, it marks the region as invalid at step 512.

At step 514, after all the graphics for the window are generated, any invalid regions are re-visited and the most defensible frontier fill repair algorithm is invoked to try to fix the bad regions. A determination is made at step 516 regarding whether the region has been fixed. If successful, the list of outer bounds and inner bounds are rebuilt and the region is marked as valid at step 510.

If the fix fails, the region is marked with the kill flag at step 518. The region is only removed when the application moves to a tool that will not try to fix the region. Typically, this means that if a user drags a curve breaking the fill, the user has the opportunity to select a different curve and move it to re-establish the fill.

Most Defensible Frontier (MDF) Algorithm

The goal of the MDF algorithm is to take broken regions, and make a good choice of how to repair them. The goal is to end up with a disjointed set of closed contours defining one or more outer boundaries and one or more inner boundaries. The metaphor of a partially walled region comprised of plots of land may be used as an example of the basic algorithm. It may be assumed that the plots adjacent to the wall (on the correct side) are to be defended, but other plots can be taken over as necessary, so that the "frontier" of the region is more easily defended. One frontier is considered more defensible than another if it (1) has a smaller length, and/or (2) has fewer corners.

Figure 6:
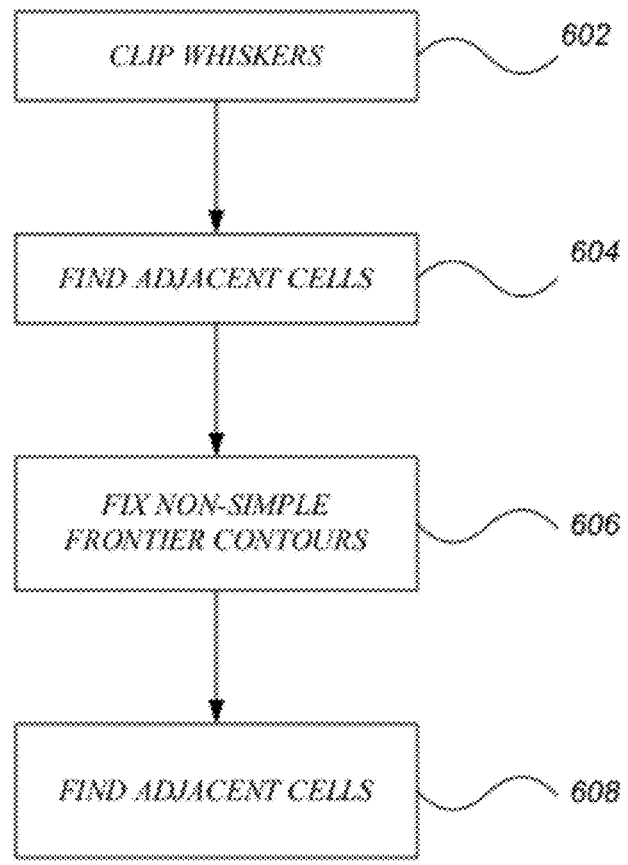
FIG. 6 illustrates the logical flow for repairing a broken region based on the MDF algorithm in accordance with one or more embodiments of the invention.
Figure 7:
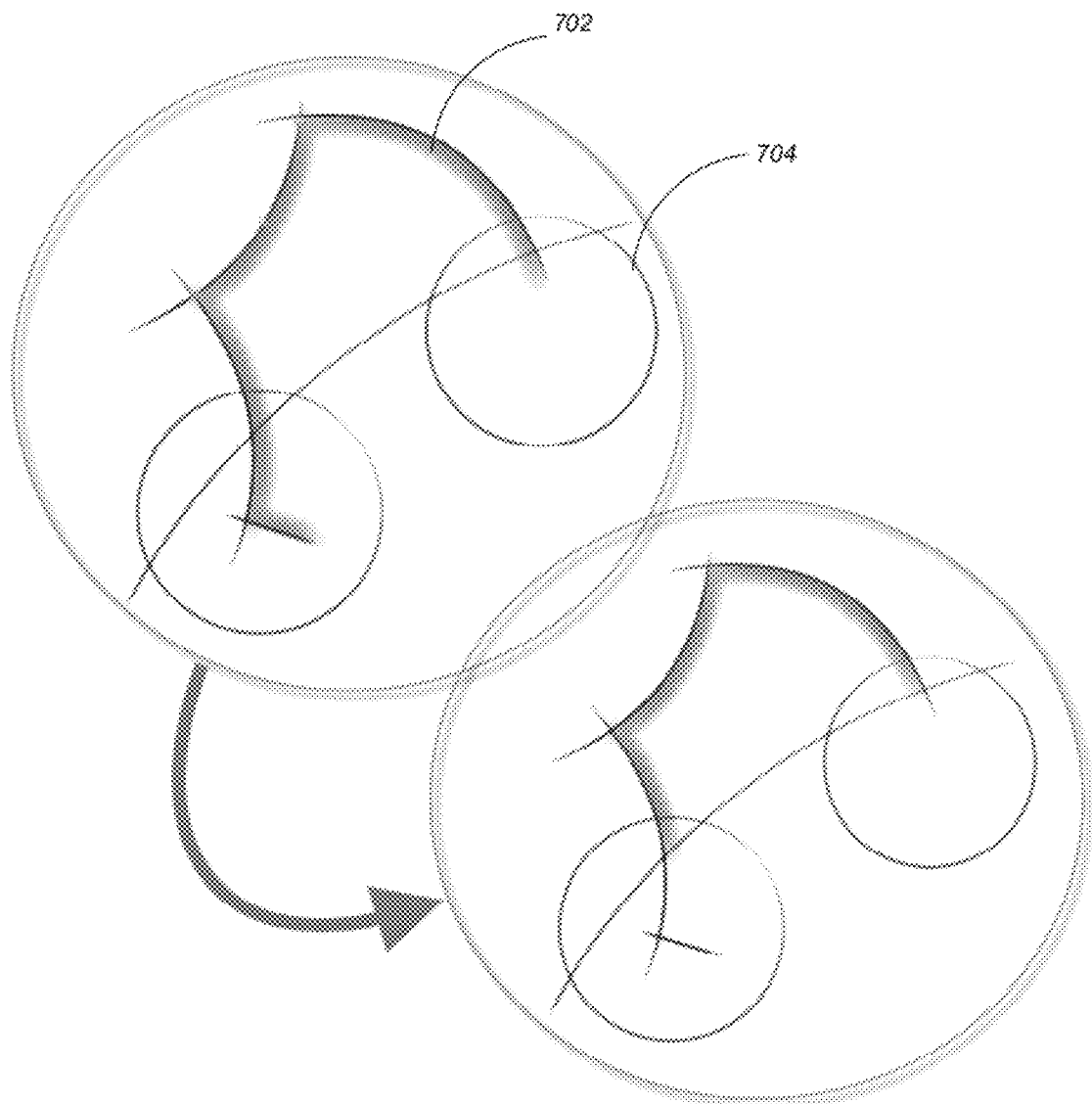
FIG. 7 illustrates the first step of FIG. 6 (of clipping whiskers) in accordance with one or more embodiments of the invention.

FIG. 6 illustrates the logical flow for repairing a broken region based on the MDF algorithm in accordance with one or more embodiments of the invention. FIG. 7 illustrates the first step of FIG. 6. At step 602, the whiskers are clipped, which means that the ends of the contours 702 that are interior to a cell without being on the boundary are removed. This may include several segments. In FIG. 7, for purposes of this description, it is assumed that the contours 702 are oriented such that the fill is on the left (i.e., illustrated as the inside of the boundaries) and the drawing depicts contour fragments 702 and other curves 704 in the drawing.

Figure 8:
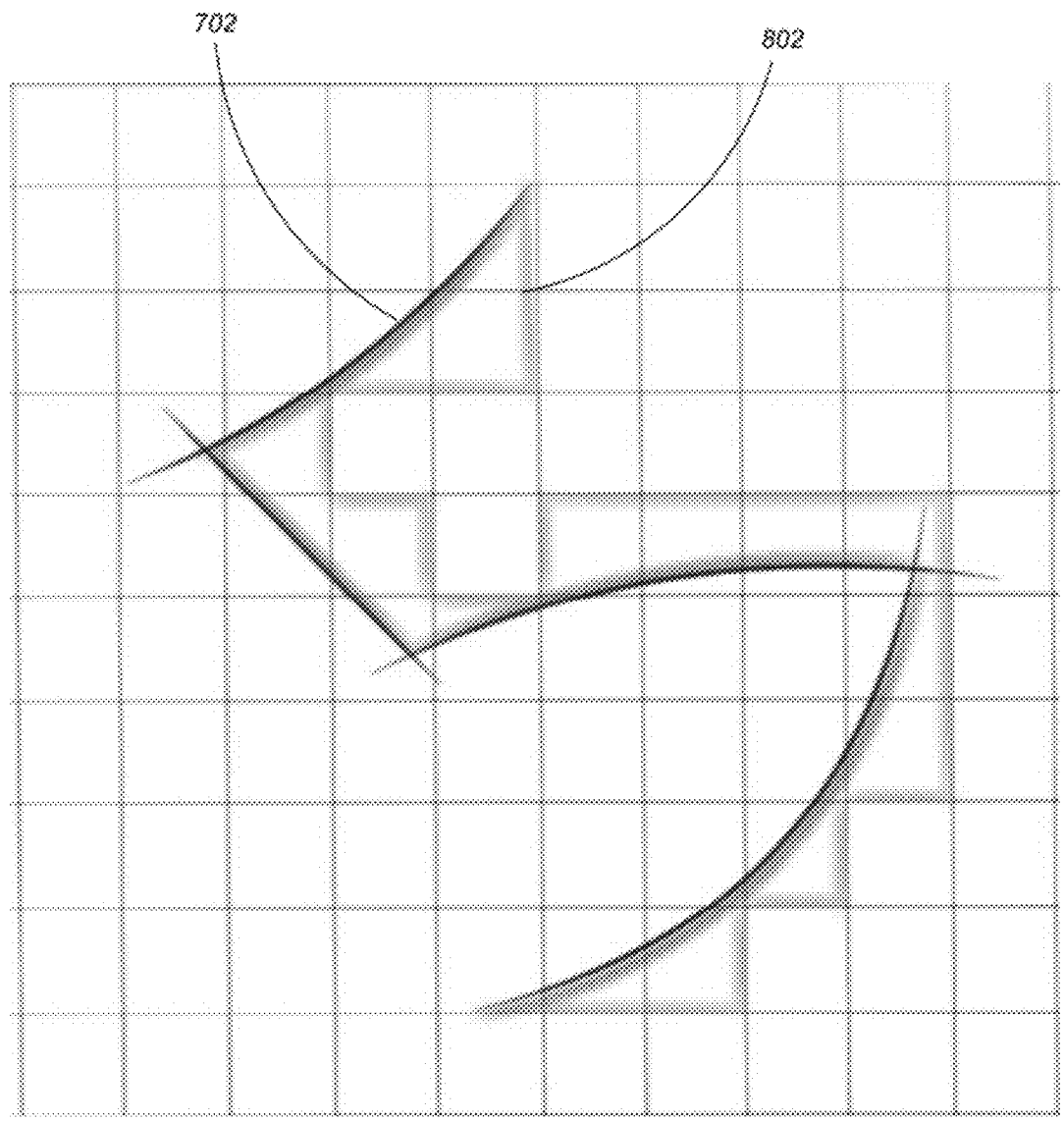
FIG. 8 illustrates the finding of cells adjacent to the contour segments in accordance with one or more embodiments of the invention.

At step 604, the cells adjacent to the contour segments 702 on the left are found (as illustrated in FIG. 8). Such cells at least should be part of the fill region. A utility algorithm (known in the art) may be used to help find the adjacent cells. If some segment 702 has no adjacent cell on the left, then the find process stops. The boundaries of the interior cells that are not part of the original contour 702 form the first wavefront.

In FIG. 8, the frontier that is being added to the fill is indicated by reference 802. As illustrated herein, contour fragments 702 are indicated in thick darker shades while the frontier 802 is illustrated as a thick light shade, while thin dark lines 704 indicate other curves in the drawing.

Figure 9:
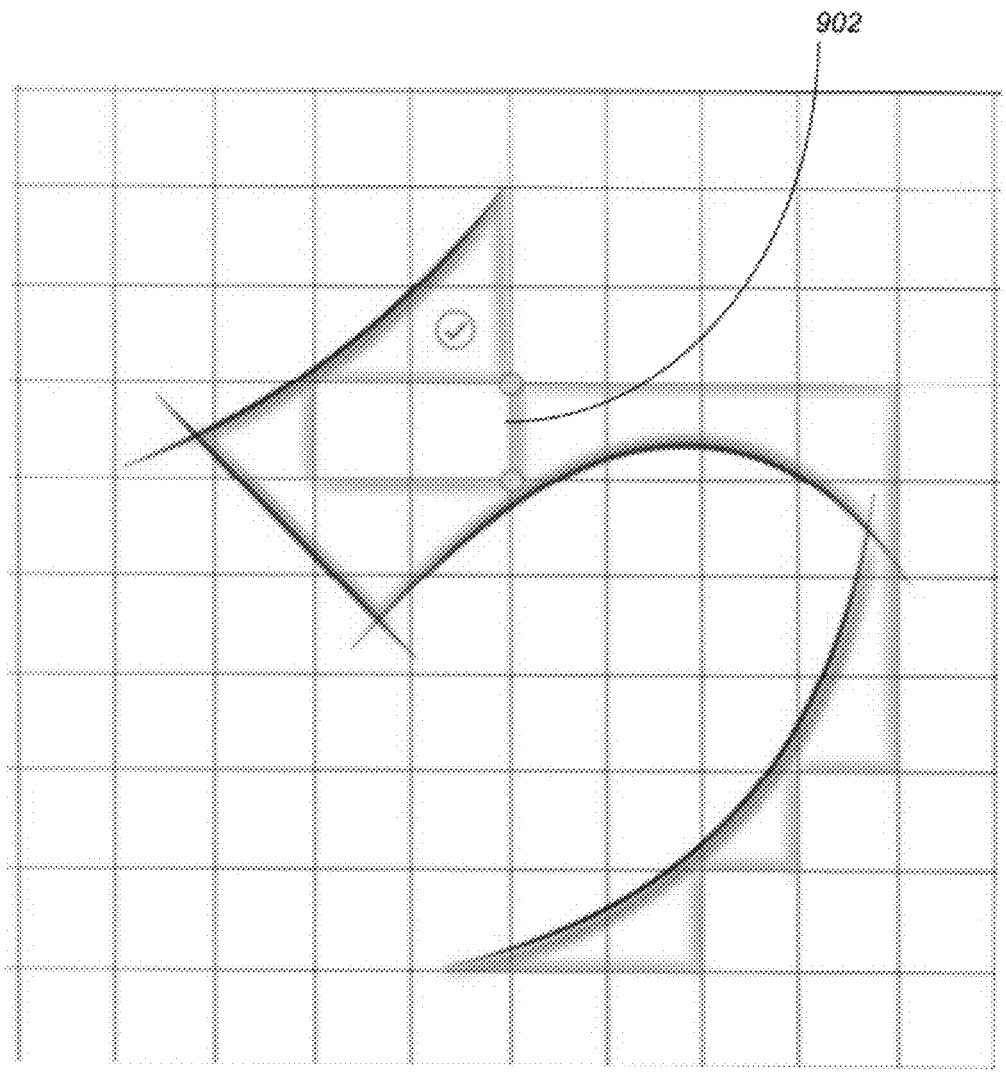
FIG. 9 illustrates non-simple frontier contours that are fixed in accordance with one or more embodiments of the invention.
Figure 10:
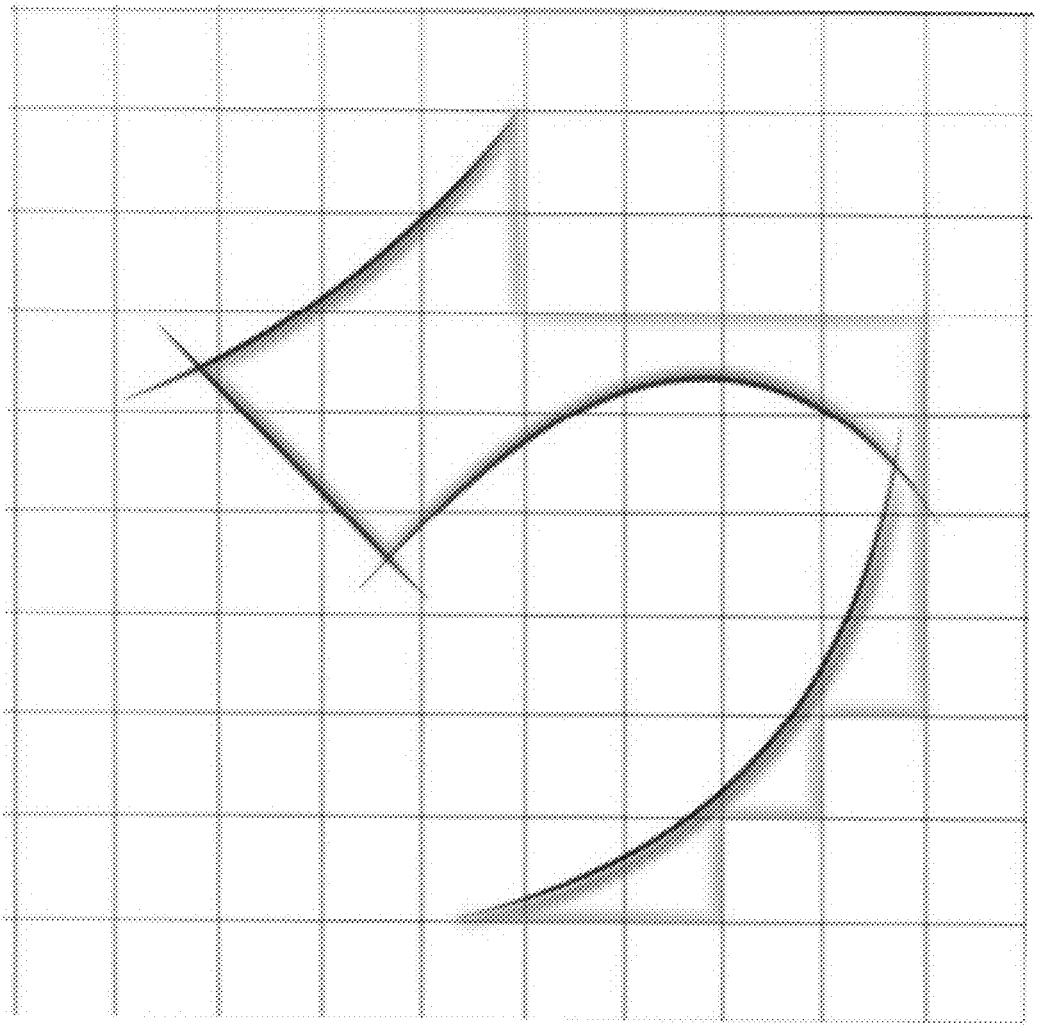
FIG. 10 illustrates a frontier yielded by taking the least cost path of the initial frontier from FIG. 9 in accordance with one or more embodiments of the invention.

At step 606, non-simple frontier contours are fixed (as illustrated in FIG. 9). In this regard, sometimes the result of capturing adjacent cells leads to a non-simple frontier contour 902. This is easily fixed by using the well documented least cost path algorithm, where the cost of each edge is its approximate length. The result of taking the least cost path of the initial frontier from FIG. 9 yields the frontier illustrated in FIG. 10. Steps 602-606 completes the first phase of the MDF algorithm.

Figure 11:
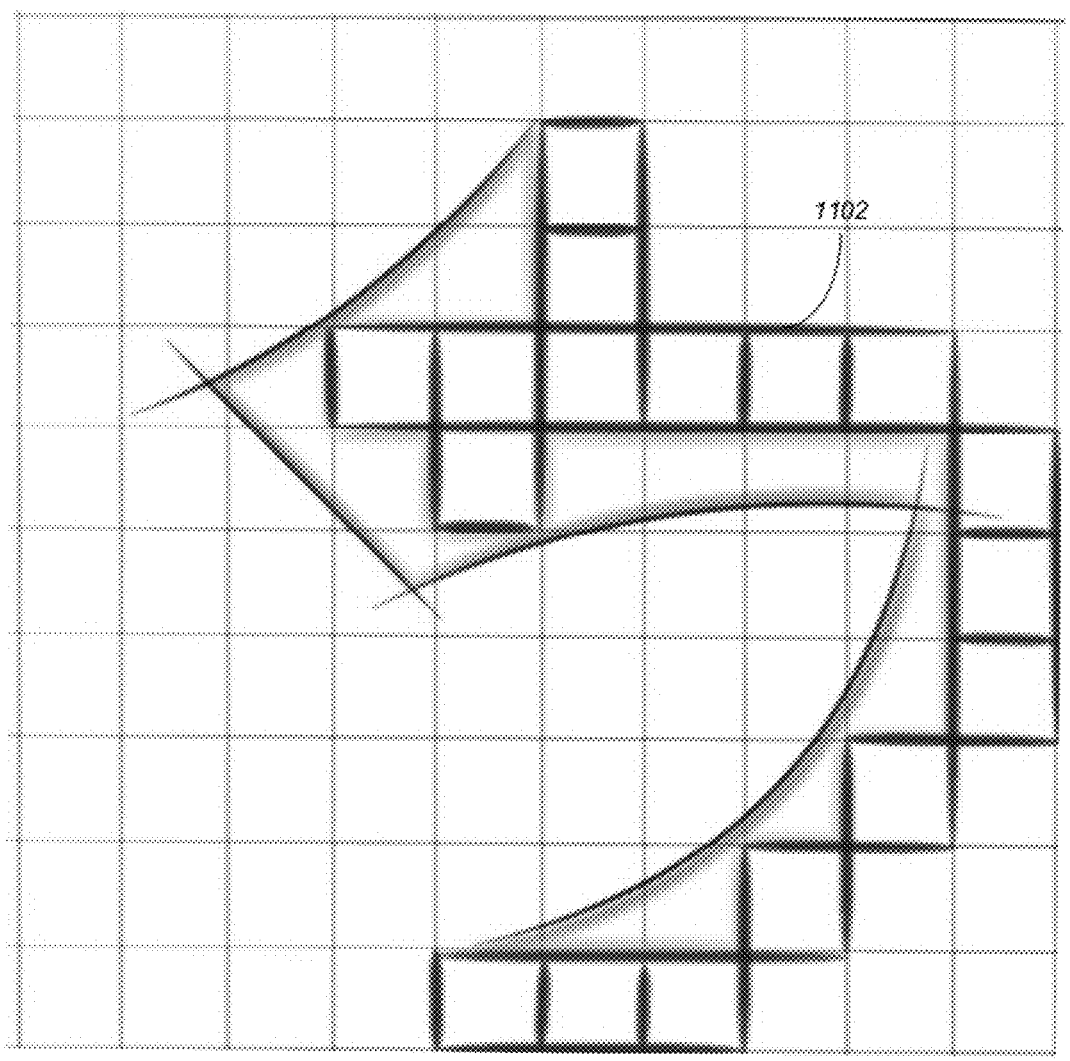
FIG. 11 illustrates cells with the frontier illustrated just to the left in accordance with one or more embodiments of the invention.
Figure 12:
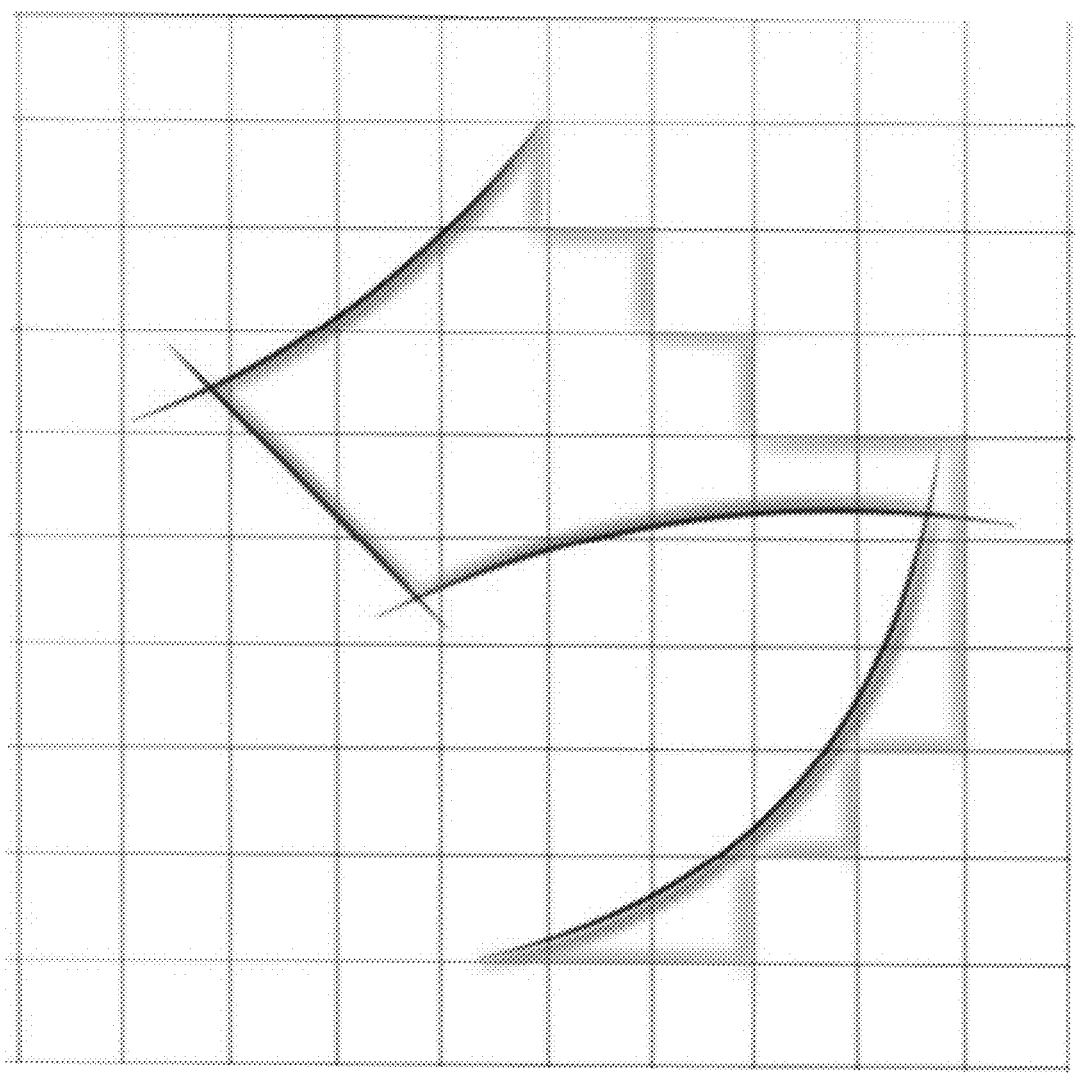
FIG. 12 illustrates the results of finding adjacent cells in accordance with one or more embodiments of the invention.

The next phase of the MDF algorithm seeks to move the frontier to reduce the total frontier length. At step 608, all cells adjacent to the current frontier that do not contain the edge of the paper, and are not adjacent to the non-interior side of the original contour, are found. FIG. 11 illustrates such cells 1102 with the frontier 902 illustrated just to the left of such cells 1102. The results of phase 2 (i.e., step 608) might look similar to that illustrated in FIG. 12. In the example illustrated, there are many paths (i.e., frontier paths) equally short. The shortest cost path algorithm may end up choosing one of these paths according to the iteration order of the arcs on each node. One may make sure that the iteration order is deterministic, not based on something like ordering of pointers. Otherwise, different boundaries may be obtained each time the path is computed.

Figure 13:
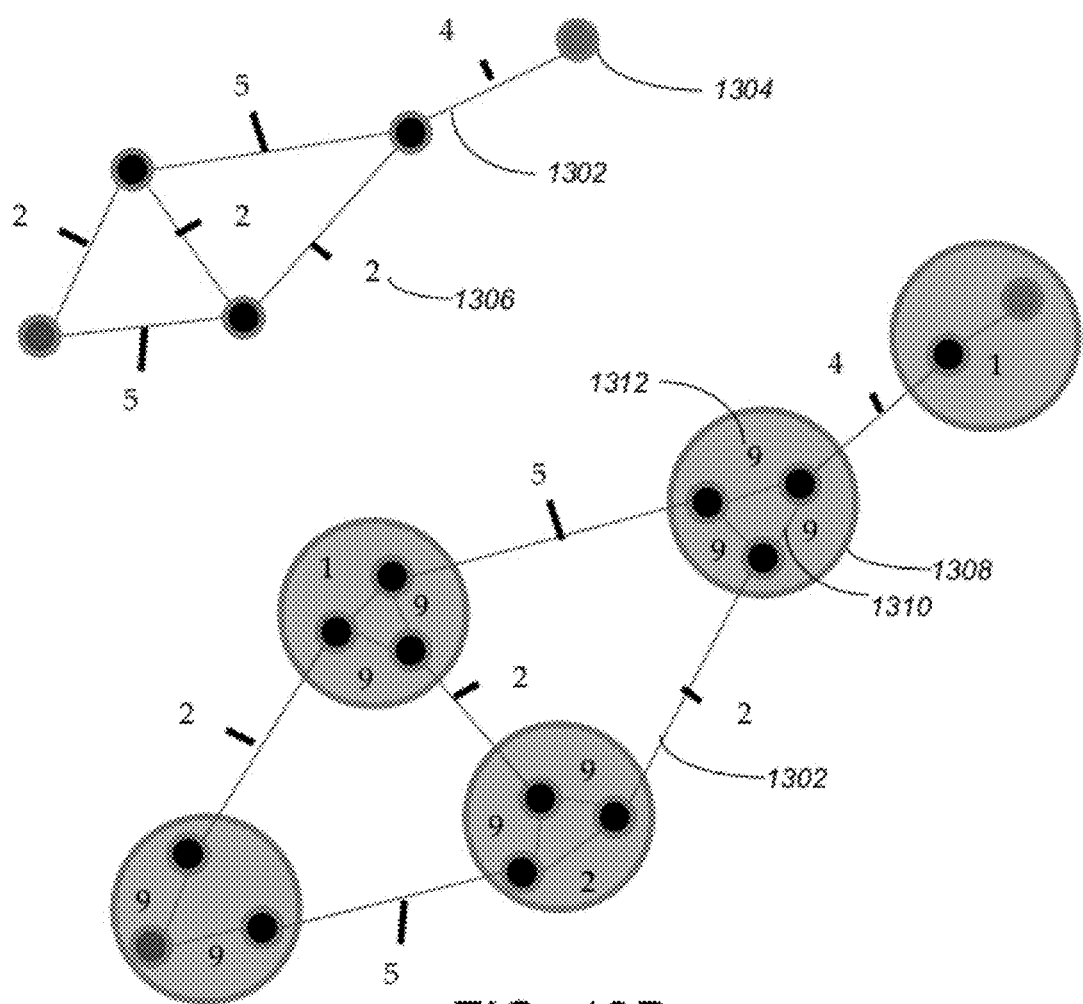
FIG. 13A illustrates a minimum path graph with segments as graph edges and the intersection of segments represented as graph vertices in accordance with one or more embodiments of the invention.
FIG. 13B illustrates a minimum path graph with segments represented as arcs/edges, ends of a segment represented as nodes, and arcs that represent the transition of one segment to another in accordance with one or more embodiments of the invention.

The obvious way to create the minimum path graph may be to represent the segments as graph edges 1302 (with a cost 1306 equal to an estimate of the edges 1302 length), and the intersection of segments represented as graph vertices 1304 (see FIG. 13A). However, a slightly different strategy provides the ability to introduce a cost for turning sharp corners. As illustrated in FIG. 13B, the segments can be represented as arcs/edges 1302 as before, but the ends of a segment 1302 can be represented as nodes 1308, and arcs 1310 can be introduced that represent the transition of one segment to another. Bending costs 1312 may then be added to these arcs 1310.

Figure 14:
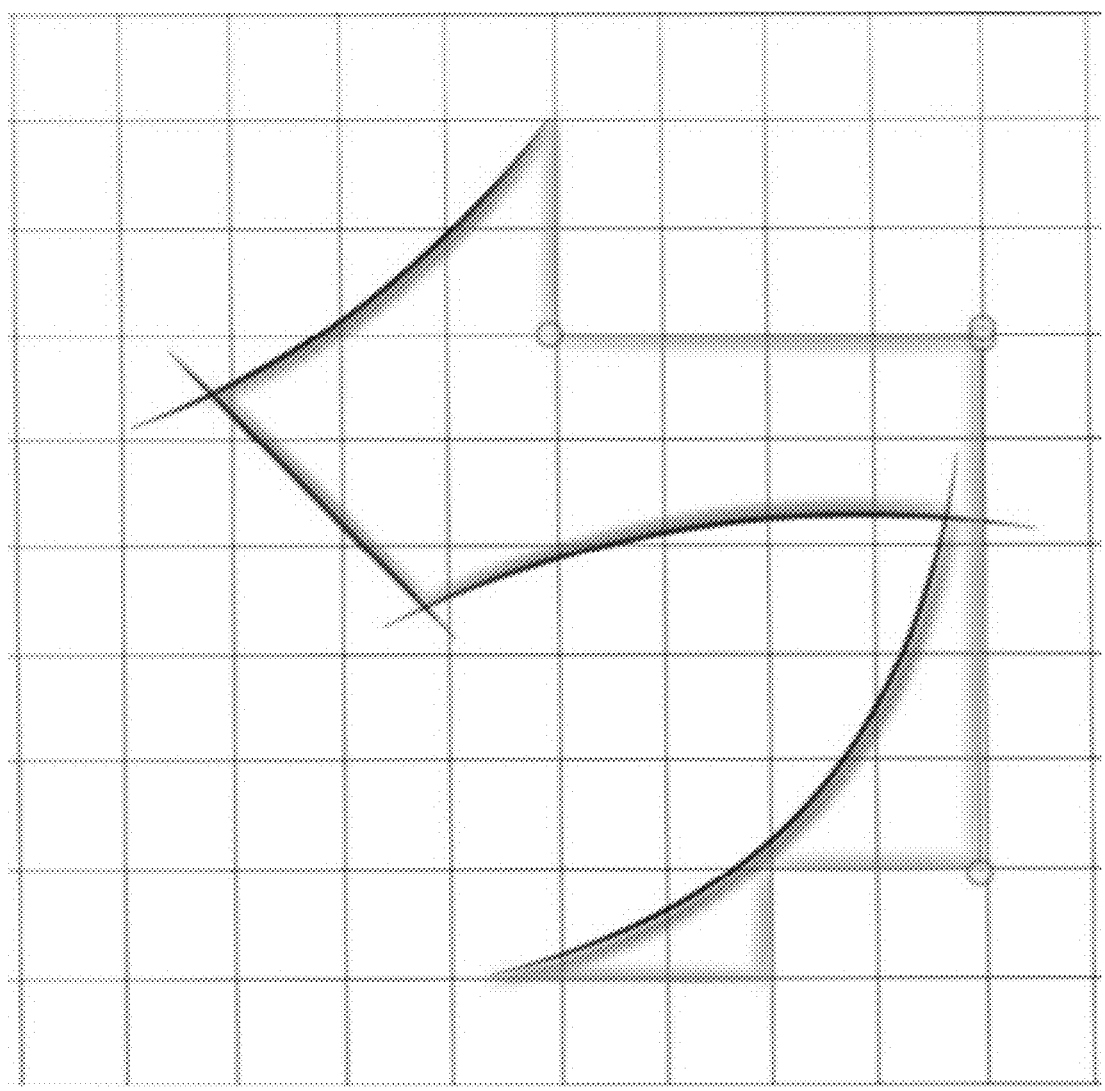
FIG. 14 illustrates a resulting contour when a cost for turning sharp corners is added in accordance with one or more embodiments of the invention.

The result of adding a cost for turning sharp corners will make a more natural contour as illustrated in FIG. 14, although it is an open question regarding how to apply a cost for turns. One option is to make the cost negligible when the transition is smooth, and equal to a fraction of the sum of the costs of the adjacent segments when sharp. In addition, a sliding scale may be used depending on how sharp the corner is.

Figure 15:
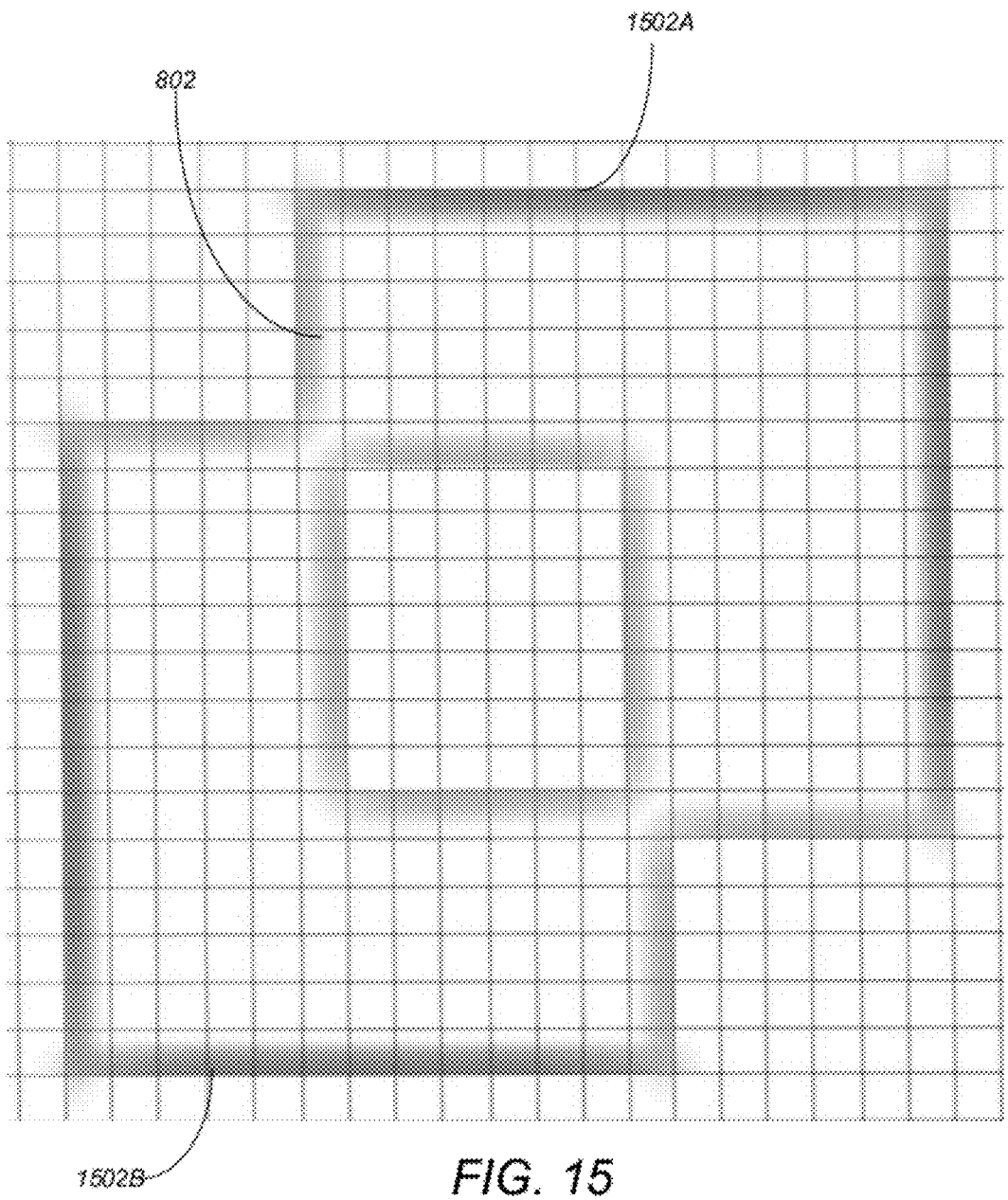
FIG. 15 illustrates splitting individual contours into separate contours in accordance with one or more embodiments of the invention.

As illustrated in FIG. 15, sometimes individual contours 1502 aren't just opened up, sometimes they're split into separate contours 1502A and 1502B. Any of these separate contours 1502 that are closed, get handled as separate contours 1502. Sometimes some of the opened ones can be combined. If the repaired open contours touch (e.g., illustrated by the frontiers 802 touching in FIG. 15), then holes can be removed, and the MDF algorithm can be applied to fill in more area.

Figure 16:
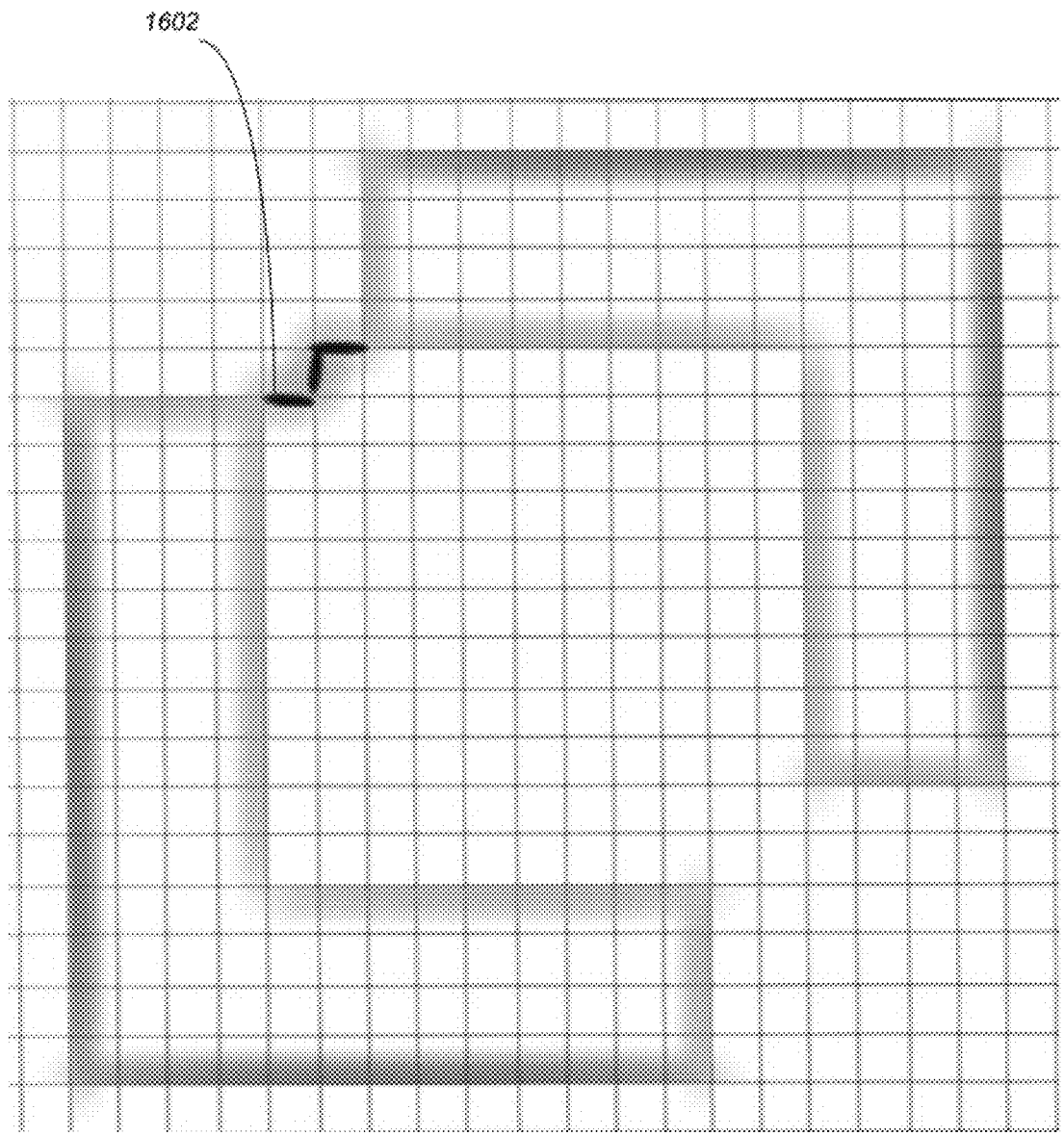
FIG. 16 illustrates the joining of disjointed frontiers using a filament in accordance with one or more embodiments of the invention.

Referring to FIG. 16, if the pairs don't touch, they can be joined by finding a filament 1602 between the disjoint frontiers, and then applying the basic algorithm to the result.

Figure 17:
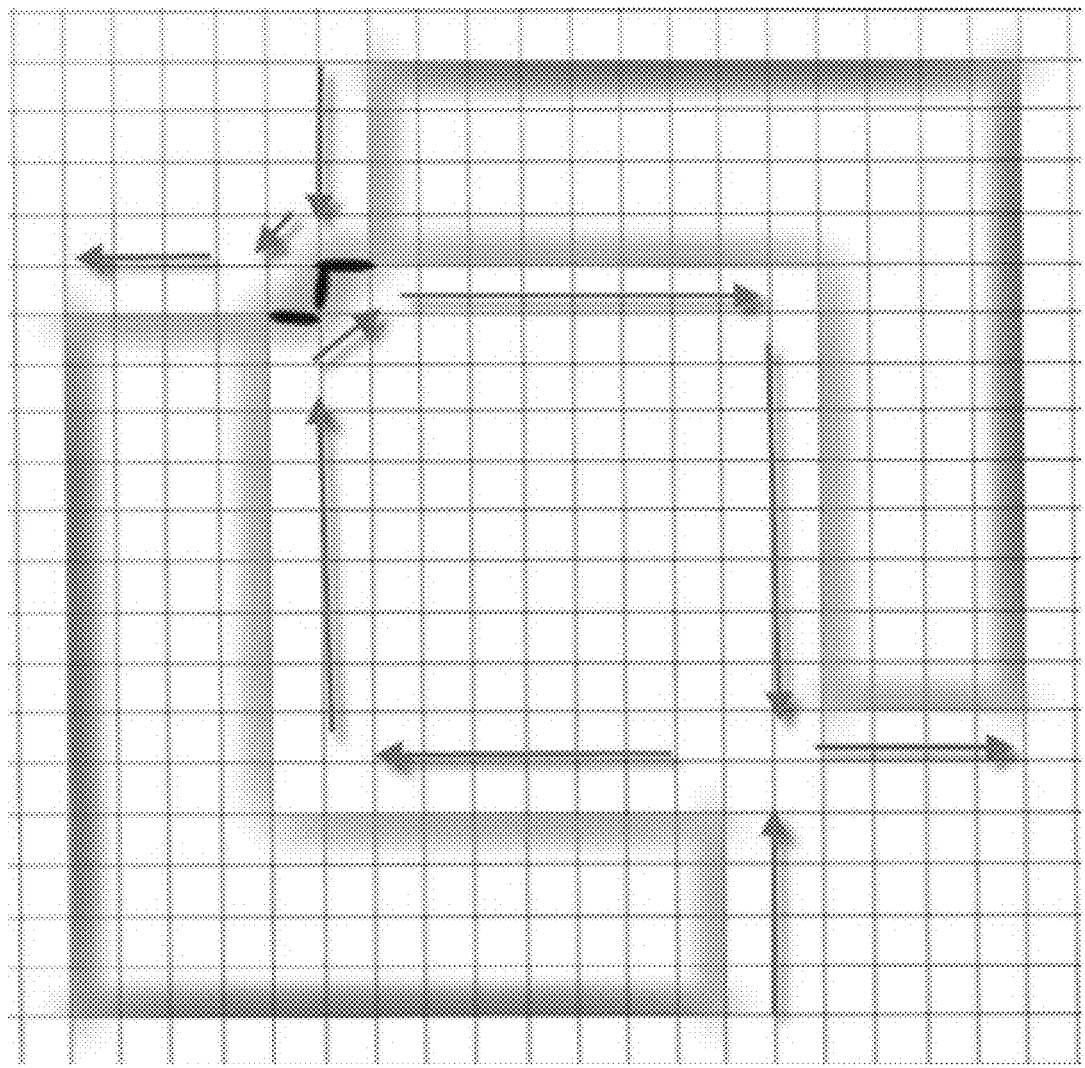
FIG. 17 illustrates the finding of a filament by selected drawing lines that are not in the region in accordance with one or more embodiments of the invention.

Referring to FIG. 16, to find the filament, drawing lines may be selected that are not in the region so far. A bounding circle or some other means may be used so that the entire drawing is not being examined. Splicing with the filament creates two frontier segments (one on each side of the filament [note that both sides of the filament 1602 are shaded]). The result is a contour that encompasses both regions, and includes a "region" of zero area along the filament (FIG. 17). The basic MDF algorithm may then be applied to those resulting frontiers.

Figure 18:
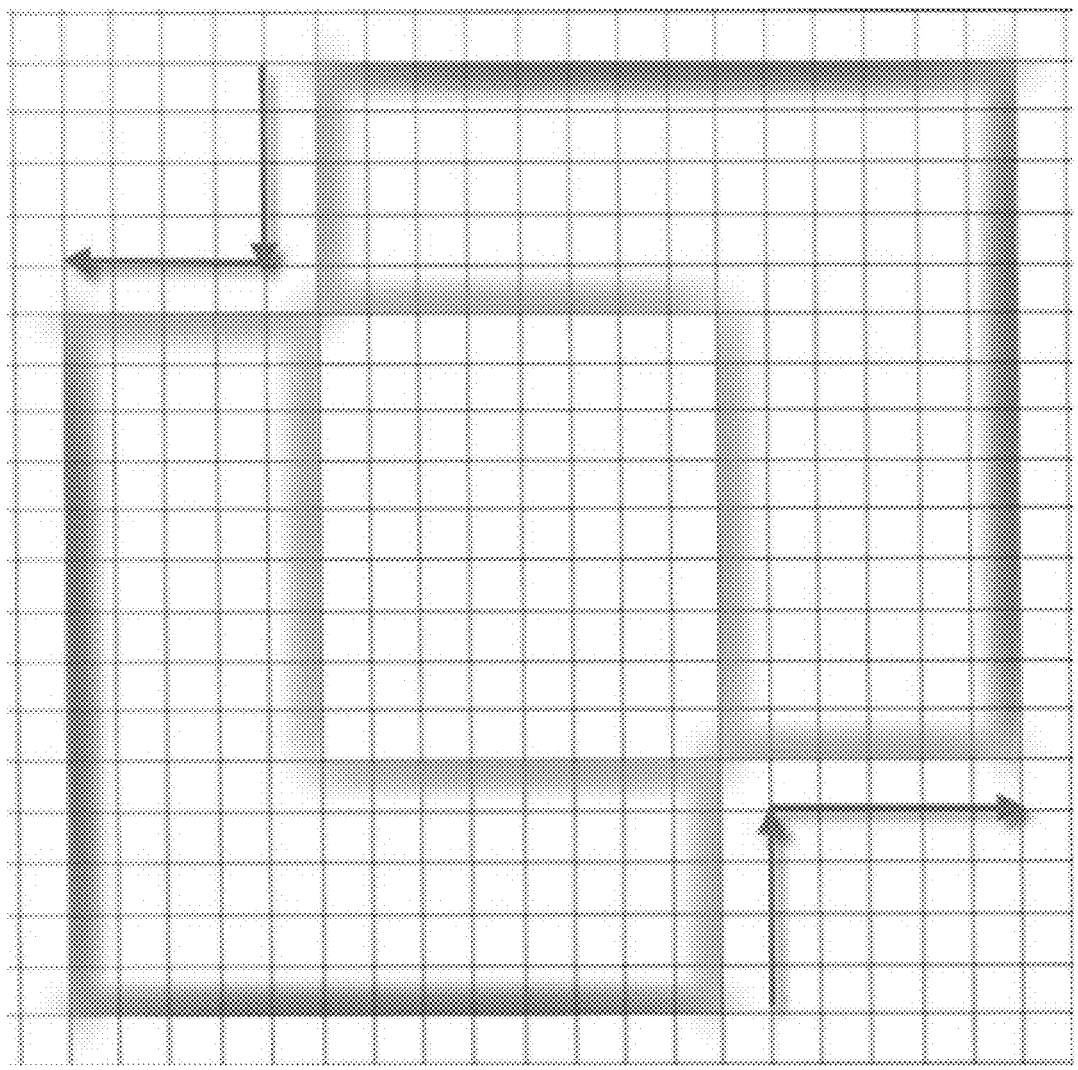
FIG. 18 illustrates overlapping regions for two contours at one point in accordance with one or more embodiments of the invention.

Referring to FIG. 18, sometimes the regions for the two contours may overlap at one point. In that case, orientation may come to the rescue. Orientation allows the situation to be broken into two frontiers and a removable hole.

Figure 19:
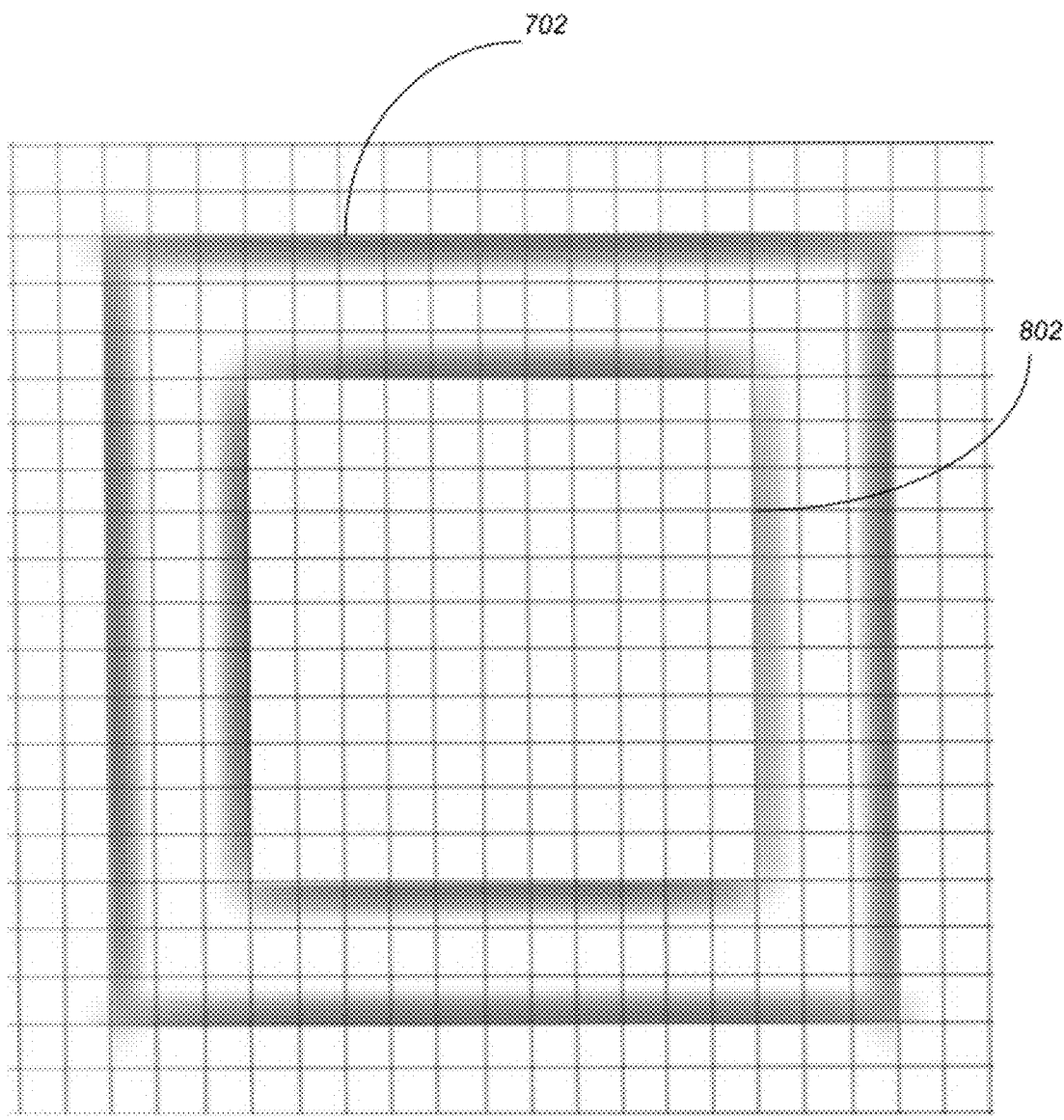
FIG. 19 illustrates interior contours that are reversed in accordance with one or more embodiments of the invention.

Referring to FIG. 19, interior contours 702 may be reversed, and then the basic algorithm is applied. The resulting frontier 802 is then reversed again.

General Logical Flow

Figure 20:
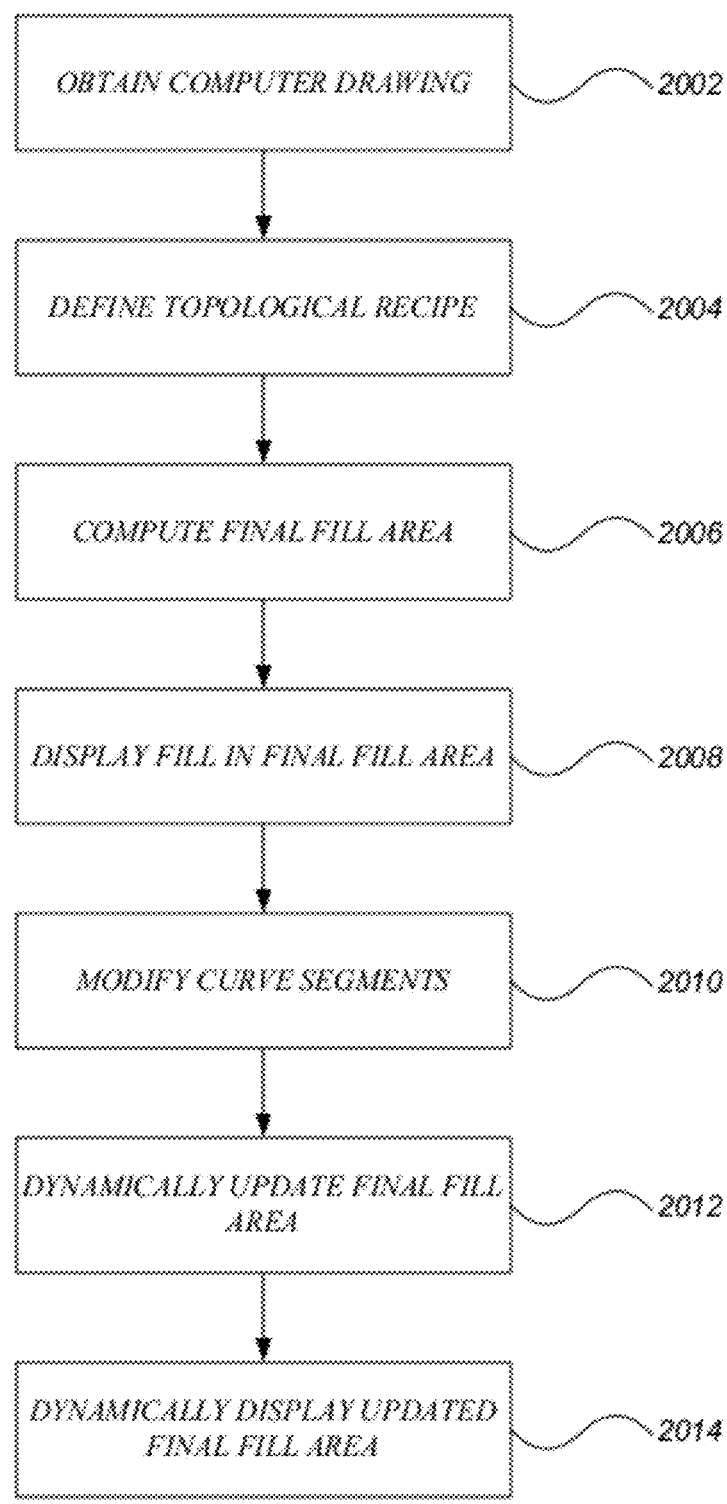
FIG. 20 is a flow chart illustrating the general logical flow for performing an update of a fill region in accordance with one or more embodiments of the invention.

In view of the above, embodiments of the invention provide the ability to update a fill region of a computer drawing. FIG. 20 is a flow chart illustrating the general logical flow for performing such an update.

At step 2002, a computer drawing is obtained in a computer drawing application.

At step 2004, a topological recipe representing the fill region is defined. The topological recipe includes a region set, a contour set, and one or more curve segments. The region set represents regions to be filled and the regions are defined as areas bound by contours. The contour set represents contours that are a chain of curve segments.

The curve segments may include a reference to a curve via a pointer or other mechanism and termination information for a termination/termination point. The termination information may be a start and an end of a segment along the curve. Such termination information may further identify an intersection datum (indicating that additional curves cross the curve at the termination), datum indicating that a curve end of the curve (i.e., the highest or lowest parameter for a parametric curve) is to be used as the termination, a percentage along the curve, etc.

The contour set may identify/store a collection of contours. Each contour in the set may be a closed loop of curve segments (referenced by a pointer or other mechanism), connected end to end, with a flag indicating if the curve segment participates in the contour in a forward direction (in increasing parametric direction) or reverse direction (in decreasing parametric direction). Further, the contour may be assumed to be "simple" in that it does not intersect itself (e.g., as in a "FIG. 8").

The region set stores a collection of regions. Each region in the set has an outer contour (typically referenced by a pointer or other mechanism) and an arbitrary number of inner contours (typically referenced by a pointer or other mechanism).

At step 2006, the final fill area of the fill region is computed based on the topological recipe. Such a final fill area may ultimately provide the information (e.g., a list of polygons representing boundaries of an area to be filled) used by a rendering engine to generate the filled area of a computer screen. To compute the final fill area, a mechanism such as a dependency graph may be used. The dependency graph is used to guarantee that the fill data (i.e., the final fill area) is updated after curves are moved. The dependency graph has two or more nodes. Each node represents a region, contour or curve segment. Edges between the nodes indicate a dependency between the connected nodes. Once a curve is moved (e.g., as described below with respect to step 2010), the dependency graph is modified and used to dynamically update the final fill area (e.g., as in step 2012 described below). A utility object may be used to create the initial set of nodes in the compute/dependency graph.

At step 2008, a fill is displayed in the final fill area.

At step 2010, one of the curve segments is modified. Such curves may be moved/modified based on interactions between the computer drawing program and a human user of the program (e.g., using a cursor control device to move a termination point of a curve segment).

At step 2012, in response to the curve segment modification, the final fill area is dynamically updated. As described above, a dependency graph may be used to represent the final fill area. Once the curve segments have been modified, various utility objects may be used to modify the fill definition in the compute/dependency graph. In this regard, when a drawing is modified, each node that corresponds to an entity that has been modified (and nodes dependent upon such a node) has a respective dirty bit that is marked as dirty. When updating the final fill area, the dependency/compute graph is traversed and each node marked as dirty is resolved. Such a resolving process may proceed as illustrated in FIG. 5 (steps 508-518) and described above.

In addition, a compute object (e.g., that traverses the compute/dependency graph) may have various responsibilities. Such responsibilities include verifying that a topology of the regions, contours, and curve segments is intact. If the fill region is not well formed, the compute object may attempt to repair the fill region (i.e., as described above with respect to the MDF process of FIGS. 5 and 6). In addition, the compute graph is responsible for updating the information used by the rendering engine to process the fill.

At step 2014, the updated final fill area is dynamically displayed (e.g., by a rendering engine). Such a dynamic update and display is performed in real-time as the curve segment is modified and additional user action (beyond movement of the curve segment) is not required to perform the update and display.

Conclusion

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computer-implemented method for updating a fill region of a computer drawing, comprising:
   (a) obtaining the computer drawing in a computer drawing application;
   (b) defining a topological recipe representing the fill region, wherein the topological recipe comprises:
      (i) a region set representing one or more regions to be filled, wherein the one or more regions to be filled are defined as one or more areas bound by one or more contours;
      (ii) a contour set representing the one or more contours, wherein the one or more contours comprise a chain of one or more curve segments; and
      (iii) the one or more curve segments;
   (c) computing a final fill area of the fill region based on the topological recipe;
   (d) displaying a fill in the final fill area;
   (e) modifying one or more of the one or more curve segments;

(f) in response to the modifying, dynamically updating the final fill area; and (g) dynamically displaying the updated final fill area.

2. The computer-implemented method of claim 1, wherein:
the final fill area is computed by creating a dependency graph that represents the final fill area, wherein the dependency graph comprises two or more nodes that represent (i) the one or more regions, (ii) the one or more contours, and (iii) the one or more curve segments, wherein edges between nodes indicate a dependency between the connected nodes; and the dynamically updating the final fill area comprises modifying the dependency graph.

3. The computer-implemented method of claim 2, wherein:
each of the two or more nodes has a respective dirty bit;
the modifying one or more of the one or more curve segments comprises:
for each node that corresponds to an entity that has been modified, and for nodes dependent on such a node, marking the respective dirty bit as dirty;
the dynamically updating comprises resolving each of the nodes marked as dirty.

4. The computer-implemented method of claim 1, wherein each of the one or more curve segments comprises:
a reference to a curve via a pointer or other mechanism; and
termination information for a termination, wherein the termination information comprises a start and an end of a segment along the curve.

5. The computer-implemented method of claim 4, wherein the termination information comprises an intersection datum, indicating that one or more additional curves cross the curve at the termination.

6. The computer-implemented method of claim 4, wherein the termination information comprises a datum indicating that a curve end of the curve is to be used as the termination.

7. The computer-implemented method of claim 4, wherein the termination information comprises a percentage along the curve.

8. The computer-implemented method of claim 1, wherein:
the contour set comprises a collection of the one or more contours;
each of the one or more contours comprises a closed loop of the one or more curve segments;
the one or more curve segments are connected end to end; and
each of the one or more curve segments has a flag indicating if the curve segment participates in the contour in a forward direction or in a reverse direction.

9. The computer-implemented method of claim 1, wherein:
(a) the region set comprises a collection of the one or more regions;
(b) each of the one or more regions comprises:
(i) an outer contour of the one or more contours; and
(ii) an arbitrary number of inner contours of the one or more contours.

10. The computer-implemented method of claim 1, wherein:
the final fill area comprises information used by a rendering engine to generate a filled area of a computer screen.

11. The computer-implemented method of claim 1, wherein:
the final fill area comprises a list of polygons representing boundaries of an area to be filled.

12. The computer-implemented method of claim 1, wherein:
(a) the computing the final fill area comprises:
(i) verifying that a topology of the one or more regions, the one or more contours, and the one or more curve segments is intact; and
(ii) if the fill region is not well formed, attempting to repair the fill region; and
(b) updating information used by a rendering engine to process the topological recipe.

13. An apparatus for updating a fill region of a computer drawing in a computer system comprising:
(a) a computer having a memory; and
(b) a computer drawing application executing on the computer, wherein the computer drawing application is configured to:
(i) obtain the computer drawing;
(ii) define a topological recipe representing the fill region, wherein the topological recipe comprises:
(1) a region set representing one or more regions to be filled, wherein the one or more regions to be filled are defined as one or more areas bound by one or more contours;
(2) a contour set representing the one or more contours, wherein the one or more contours comprise a chain of one or more curve segments; and
(3) the one or more curve segments;
(iii) compute a final fill area of the fill region based on the topological recipe;
(iv) display a fill in the final fill area;
(v) modify one or more of the one or more curve segments;
(vi) in response to the modifying, dynamically update the final fill area; and
(vii) dynamically display the updated final fill area.

14. The apparatus of claim 13, wherein:
the final fill area is computed by creating a dependency graph that represents the final fill area, wherein the dependency graph comprises two or more nodes that represent (i) the one or more regions, (ii) the one or more contours, and (iii) the one or more curve segments, wherein edges between nodes indicate a dependency between the connected nodes; and
the computer is configured to dynamically update the final fill area by modifying the dependency graph.

15. The apparatus of claim 14, wherein:
each of the two or more nodes has a respective dirty bit;
the computer is configured to modify the one or more of the one or more curve segments by:
for each node that corresponds to an entity that has been modified, and for nodes dependent on such a node, marking the respective dirty bit as dirty;
the computer is configured to dynamically update by resolving each of the nodes marked as dirty.

16. The apparatus of claim 13, wherein each of the one or more curve segments comprises:
a reference to a curve via a pointer or other mechanism; and
termination information for a termination, wherein the termination information comprises a start and an end of a segment along the curve.

17. The apparatus of claim 16, wherein the termination information comprises an intersection datum, indicating that one or more additional curves cross the curve at the termination.

18. The apparatus of claim 16, wherein the termination information comprises a datum indicating that a curve end of the curve is to be used as the termination.

19. The apparatus of claim 16, wherein the termination information comprises a percentage along the curve.

20. The apparatus of claim 13, wherein:

the contour set comprises a collection of the one or more contours;

each of the one or more contours comprises a closed loop of the one or more curve segments;

the one or more curve segments are connected end to end; and each of the one or more curve segments has a flag indicating if the curve segment participates in the contour in a forward direction or in a reverse direction.

21. The apparatus of claim 13, wherein:
(a) the region set comprises a collection of the one or more regions;
(b) each of the one or more regions comprises:
   (i) an outer contour of the one or more contours; and
   (ii) an arbitrary number of inner contours of the one or more contours.

22. The apparatus of claim 13, wherein:
the final fill area comprises information used by a rendering engine to generate a filled area of a computer screen.

23. The apparatus of claim 13, wherein:
the final fill area comprises a list of polygons representing boundaries of an area to be filled.

24. The apparatus of claim 13, wherein:
(a) the computer is configured to compute the final fill area by:
   (i) verifying that a topology of the one or more regions, the one or more contours, and the one or more curve segments is intact; and
   (ii) if the fill region is not well formed, attempting to repair the fill region; and
(b) the computer is configured to update information used by a rendering engine to process the topological recipe.

\* \* \* \* \*